(12) United States Patent
Fuhrer et al.

(10) Patent No.: US 11,928,707 B2
(45) Date of Patent: *Mar. 12, 2024

(54) SYSTEMS AND METHODS TO PRE-SCALE MEDIA CONTENT TO FACILITATE AUDIENCE MEASUREMENT

(71) Applicant: The Nielsen Company (US), LLC, New York, NY (US)

(72) Inventors: Brian Fuhrer, Palm Harbor, FL (US); Morris Lee, Palm Harbor, FL (US); Alexander Topchy, New Port Richey, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/155,020

(22) Filed: Jan. 16, 2023

(65) Prior Publication Data

US 2023/0177559 A1 Jun. 8, 2023

Related U.S. Application Data

(63) Continuation of application No. 17/138,475, filed on Dec. 30, 2020, now Pat. No. 11,568,439, which is a
(Continued)

(51) Int. Cl.
*G06Q 30/02* (2023.01)
*G06F 3/16* (2006.01)
(Continued)

(52) U.S. Cl.
CPC ........... *G06Q 30/0242* (2013.01); *G06F 3/16* (2013.01); *G06Q 30/0244* (2013.01);
(Continued)

(58) Field of Classification Search
CPC .......... G06Q 30/0242; G06Q 30/0244; G06Q 30/0251; G06Q 30/0272; G06F 3/16;
(Continued)

(56) References Cited

U.S. PATENT DOCUMENTS

| | | |
|---|---|---|
| 3,056,135 A | 9/1962 | Currey et al. |
| 3,760,275 A | 9/1973 | Ohsawa et al. |

(Continued)

FOREIGN PATENT DOCUMENTS

| | | |
|---|---|---|
| EP | 0750819 | 1/2002 |
| EP | 1213860 | 6/2002 |

(Continued)

OTHER PUBLICATIONS

"Arbitron & Scarborough Unveil New Mall Shopper Audience Measurement," Streamline Media Inc., retrieved from <http://www.radioink.com/HeadlineEntry.asp?hid=135452&pt=todaysnews>, retrieved Jun. 22, 2007 (1 page).
(Continued)

*Primary Examiner* — Patrick McAtee
*Assistant Examiner* — Nakia Leffall-Allen

(57) ABSTRACT

Methods and apparatus for pre-scaling media content to facilitate audience measurement are disclosed. An example method includes encoding a media content sample in accordance with a first encoding configuration and playing the encoded sample. The example method also includes attempting to detect the codes in the sample, and computing a ratio between the codes encoded in the sample and the codes detected when the sample is played.

20 Claims, 10 Drawing Sheets

Related U.S. Application Data continuation of application No. 11/966,414, filed on Dec. 28, 2007, now Pat. No. 10,885,543.

(60) Provisional application No. 60/882,695, filed on Dec. 29, 2006.

(51) Int. Cl.
*G06Q 30/0242* (2023.01)
*G06Q 30/0251* (2023.01)
*G06Q 30/0272* (2023.01)
*H04N 7/24* (2011.01)

(52) U.S. Cl.
CPC ..... *G06Q 30/0251* (2013.01); *G06Q 30/0272* (2013.01); *H04N 7/24* (2013.01)

(58) Field of Classification Search
CPC .... G06F 3/165; H04N 7/24; H04N 21/23614; H04N 21/44204; H04N 21/6582; H04N 21/812; H04N 21/8358; H04N 21/84
See application file for complete search history.

(56) References Cited

U.S. PATENT DOCUMENTS

| | | |
|---|---|---|
| 3,810,156 A | 5/1974 | Goldman |
| 4,107,734 A | 8/1978 | Percy et al. |
| 4,230,990 A | 10/1980 | Lert, Jr. et al. |
| 4,382,291 A | 5/1983 | Nakauchi |
| 4,450,531 A | 5/1984 | Kenyon et al. |
| 4,606,044 A | 8/1986 | Kudo |
| 4,626,904 A | 12/1986 | Lurie |
| 4,644,509 A | 2/1987 | Kiewit et al. |
| 4,695,879 A | 9/1987 | Weinblatt |
| 4,697,209 A | 9/1987 | Kiewit et al. |
| 4,718,106 A | 1/1988 | Weinblatt |
| 4,769,697 A | 9/1988 | Gilley et al. |
| 4,779,198 A | 10/1988 | Lurie |
| 4,805,020 A | 2/1989 | Greenberg |
| 4,930,011 A | 5/1990 | Kiewit |
| 4,955,000 A | 9/1990 | Nastrom |
| 4,967,273 A | 10/1990 | Greenberg |
| 4,972,471 A | 11/1990 | Gross et al. |
| 4,972,503 A | 11/1990 | Zurlinden |
| 4,990,892 A | 2/1991 | Guest et al. |
| 5,119,104 A | 6/1992 | Heller |
| 5,146,231 A | 9/1992 | Ghaem et al. |
| 5,226,090 A | 7/1993 | Kimura |
| 5,226,177 A | 7/1993 | Nickerson |
| 5,285,498 A | 2/1994 | Johnston |
| 5,319,453 A | 6/1994 | Copriviza et al. |
| 5,355,161 A | 10/1994 | Bird et al. |
| 5,382,970 A | 1/1995 | Kiefl |
| 5,387,993 A | 2/1995 | Heller et al. |
| 5,404,377 A | 4/1995 | Moses |
| 5,425,100 A | 6/1995 | Thomas et al. |
| 5,436,653 A | 7/1995 | Ellis et al. |
| 5,437,050 A | 7/1995 | Lamb et al. |
| 5,442,343 A | 8/1995 | Cato et al. |
| 5,450,490 A | 9/1995 | Jensen et al. |
| 5,457,807 A | 10/1995 | Weinblatt |
| 5,473,631 A | 12/1995 | Moses |
| 5,481,294 A | 1/1996 | Thomas et al. |
| 5,483,276 A | 1/1996 | Brooks et al. |
| 5,491,517 A | 2/1996 | Kreitman et al. |
| 5,550,928 A | 8/1996 | Lu et al. |
| 5,574,962 A | 11/1996 | Fardeau et al. |
| 5,579,124 A | 11/1996 | Aijala et al. |
| 5,581,658 A | 12/1996 | O'Hagan et al. |
| 5,581,800 A | 12/1996 | Fardeau et al. |
| 5,621,454 A | 4/1997 | Ellis et al. |
| 5,629,739 A | 5/1997 | Dougherty |
| 5,630,203 A | 5/1997 | Weinblatt |
| 5,640,144 A | 6/1997 | Russo et al. |
| 5,646,675 A | 7/1997 | Copriviza et al. |
| 5,687,191 A | 11/1997 | Lee et al. |
| 5,692,215 A | 11/1997 | Kutzik et al. |
| 5,731,846 A | 3/1998 | Kreitman et al. |
| 5,764,763 A | 6/1998 | Jensen et al. |
| 5,774,876 A | 6/1998 | Woolley et al. |
| 5,787,334 A | 7/1998 | Fardeau et al. |
| 5,793,409 A | 8/1998 | Tetsumura |
| 5,812,081 A | 9/1998 | Fullerton |
| 5,812,930 A | 9/1998 | Zavrel |
| 5,815,114 A | 9/1998 | Speasl et al. |
| 5,867,494 A | 2/1999 | Krishnaswamy et al. |
| 5,867,495 A | 2/1999 | Elliott et al. |
| 5,872,588 A | 2/1999 | Aras et al. |
| 5,884,278 A | 3/1999 | Powell |
| 5,892,536 A | 4/1999 | Logan et al. |
| 5,893,093 A | 4/1999 | Wills |
| 5,982,808 A | 11/1999 | Otto |
| 5,986,692 A | 11/1999 | Logan et al. |
| 5,999,525 A | 12/1999 | Krishnaswamy et al. |
| 6,002,918 A | 12/1999 | Heiman et al. |
| 6,035,177 A | 3/2000 | Moses et al. |
| 6,091,956 A | 7/2000 | Hollenberg |
| 6,098,048 A | 8/2000 | Dashefsky et al. |
| 6,102,339 A | 8/2000 | Wu et al. |
| 6,137,830 A | 10/2000 | Schneider et al. |
| 6,175,627 B1 | 1/2001 | Petrovic et al. |
| 6,243,739 B1 | 6/2001 | Schwartz et al. |
| 6,252,522 B1 | 6/2001 | Hampton et al. |
| 6,266,094 B1 | 7/2001 | Taylor, Jr. |
| 6,313,878 B1 | 11/2001 | Jankowiak |
| 6,314,234 B1 | 11/2001 | Kawamura et al. |
| 6,330,313 B1 | 12/2001 | Hunt |
| 6,330,335 B1 | 12/2001 | Rhoads |
| 6,335,927 B1 | 1/2002 | Elliott et al. |
| 6,359,557 B2 | 3/2002 | Bilder |
| 6,363,159 B1 | 3/2002 | Rhoads |
| 6,396,413 B2 | 5/2002 | Hines et al. |
| 6,397,041 B1 | 5/2002 | Ballard et al. |
| 6,400,827 B1 | 6/2002 | Rhoads |
| 6,404,898 B1 | 6/2002 | Rhoads |
| 6,421,445 B1 | 7/2002 | Jensen et al. |
| 6,424,264 B1 | 7/2002 | Giraldin et al. |
| 6,430,302 B2 | 8/2002 | Rhoads |
| 6,430,498 B1 | 8/2002 | Maruyama et al. |
| 6,433,689 B1 | 8/2002 | Hovind et al. |
| 6,467,089 B1 | 10/2002 | Aust et al. |
| 6,470,264 B2 | 10/2002 | Bide |
| 6,480,202 B1 | 11/2002 | Deguchi et al. |
| 6,493,649 B1 | 12/2002 | Jones et al. |
| 6,496,591 B1 | 12/2002 | Rhoads |
| 6,497,658 B2 | 12/2002 | Roizen et al. |
| 6,539,095 B1 | 3/2003 | Rhoads |
| 6,542,620 B1 | 4/2003 | Rhoads |
| 6,563,423 B2 | 5/2003 | Smith |
| 6,567,780 B2 | 5/2003 | Rhoads |
| 6,577,238 B1 | 6/2003 | Whitesmith et al. |
| 6,587,821 B1 | 7/2003 | Rhoads |
| 6,614,997 B2 | 9/2003 | Suzuki |
| 6,631,165 B1 | 10/2003 | Lambert et al. |
| 6,633,651 B1 | 10/2003 | Hirzalla et al. |
| 6,654,480 B2 | 11/2003 | Rhoads |
| 6,654,800 B1 | 11/2003 | Rieger, III |
| 6,675,146 B2 | 1/2004 | Rhoads |
| 6,675,174 B1 | 1/2004 | Bolle et al. |
| 6,710,812 B2 | 3/2004 | Taylor, Jr. et al. |
| 6,718,551 B1 | 4/2004 | Swix et al. |
| 6,731,625 B1 | 5/2004 | Eastep et al. |
| 6,731,942 B1 | 5/2004 | Nageli |
| 6,737,957 B1 | 5/2004 | Petrovic et al. |
| 6,741,241 B1 | 5/2004 | Jaubert et al. |
| 6,748,317 B2 | 6/2004 | Maruyama et al. |
| 6,754,181 B1 | 6/2004 | Elliott et al. |
| 6,766,524 B1 | 7/2004 | Matheny et al. |
| 6,795,565 B2 | 9/2004 | Wendt |
| 6,813,477 B1 | 11/2004 | Harris et al. |
| 6,842,877 B2 | 1/2005 | Robarts et al. |
| 6,845,170 B2 | 1/2005 | Wendt |
| 6,850,252 B1 | 2/2005 | Hoffberg |

(56) References Cited

U.S. PATENT DOCUMENTS

| | | |
|---|---|---|
| 6,871,180 B1 | 3/2005 | Neuhauser et al. |
| 6,882,837 B2 | 4/2005 | Fernandez et al. |
| 6,888,457 B2 | 5/2005 | Wilkinson et al. |
| 6,891,547 B2 | 5/2005 | Kang et al. |
| 6,892,193 B2 | 5/2005 | Bolle et al. |
| 6,898,434 B2 | 5/2005 | Pradhan et al. |
| 6,909,708 B1 | 6/2005 | Krishnaswamy et al. |
| 6,919,803 B2 | 7/2005 | Breed |
| 6,928,280 B1 | 8/2005 | Xanthos et al. |
| 6,934,508 B2 | 8/2005 | Ceresoli et al. |
| 6,940,403 B2 | 9/2005 | Kail, IV |
| 6,958,710 B2 | 10/2005 | Zhang et al. |
| 6,967,674 B1 | 11/2005 | Lausch |
| 6,968,564 B1 | 11/2005 | Srinivasan |
| 6,970,131 B2 | 11/2005 | Percy et al. |
| 6,985,159 B2 | 1/2006 | Brown |
| 7,038,619 B2 | 5/2006 | Percy et al. |
| 7,046,162 B2 | 5/2006 | Dunstan |
| 7,076,441 B2 | 7/2006 | Hind et al. |
| 7,080,061 B2 | 7/2006 | Kabala |
| 7,099,676 B2 | 8/2006 | Law et al. |
| 7,117,108 B2 | 10/2006 | Rapp et al. |
| 7,126,454 B2 | 10/2006 | Bulmer |
| 7,148,803 B2 | 12/2006 | Bandy et al. |
| 7,155,159 B1 | 12/2006 | Weinblatt et al. |
| 7,171,331 B2 | 1/2007 | Vock et al. |
| 7,174,151 B2 | 2/2007 | Lynch et al. |
| 7,194,363 B2 | 3/2007 | Schaffer et al. |
| 7,194,364 B1 | 3/2007 | Stanley |
| 7,222,071 B2 | 5/2007 | Neuhauser et al. |
| 7,224,819 B2 | 5/2007 | Levy et al. |
| 7,239,981 B2 | 7/2007 | Kolessar et al. |
| 7,248,717 B2 | 7/2007 | Rhoads |
| 7,295,108 B2 | 11/2007 | Corrado et al. |
| 7,312,752 B2 | 12/2007 | Smith et al. |
| 7,417,987 B2 | 8/2008 | Shenoy et al. |
| 7,451,092 B2 | 11/2008 | Srinivasan |
| 7,460,684 B2 | 12/2008 | Srinivasan |
| 7,460,827 B2 | 12/2008 | Schuster et al. |
| 7,463,143 B2 | 12/2008 | Forr et al. |
| 7,466,742 B1 | 12/2008 | Srinivasan |
| 7,483,975 B2 | 1/2009 | Kolessar et al. |
| 7,509,115 B2 | 3/2009 | Lynch et al. |
| 7,587,728 B2 | 9/2009 | Wheeler et al. |
| 7,616,776 B2 | 11/2009 | Petrovic et al. |
| 7,643,652 B2 | 1/2010 | Srinivasan |
| 7,724,919 B2 | 5/2010 | Rhoads |
| 7,739,705 B2 | 6/2010 | Lee et al. |
| 8,406,341 B2 | 3/2013 | Luff et al. |
| 8,761,301 B2 | 6/2014 | Luff et al. |
| 9,210,416 B2 | 12/2015 | Luff et al. |
| 10,885,543 B1 * | 1/2021 | Fuhrer ............... G06Q 30/0272 |
| 2002/0015106 A1 | 2/2002 | Taylor, Jr. |
| 2002/0032698 A1 | 3/2002 | Cox |
| 2002/0052885 A1 | 5/2002 | Levy |
| 2002/0059580 A1 | 5/2002 | Kalker et al. |
| 2002/0064149 A1 | 5/2002 | Elliott et al. |
| 2002/0068556 A1 | 6/2002 | Brown |
| 2002/0120849 A1 | 8/2002 | McKinley et al. |
| 2002/0120925 A1 | 8/2002 | Logan |
| 2002/0120930 A1 | 8/2002 | Yona |
| 2002/0122665 A1 | 9/2002 | Suzuki |
| 2002/0126872 A1 | 9/2002 | Brunk et al. |
| 2002/0141491 A1 | 10/2002 | Corts et al. |
| 2002/0144259 A1 | 10/2002 | Gutta et al. |
| 2002/0146149 A1 | 10/2002 | Brunk |
| 2002/0150387 A1 | 10/2002 | Kunii et al. |
| 2002/0157105 A1 | 10/2002 | Venneau et al. |
| 2002/0162118 A1 | 10/2002 | Levy et al. |
| 2002/0174425 A1 | 11/2002 | Markel et al. |
| 2002/0178410 A1 | 11/2002 | Haitsma et al. |
| 2002/0183059 A1 | 12/2002 | Noreen et al. |
| 2002/0198762 A1 | 12/2002 | Donato |
| 2003/0002598 A1 | 1/2003 | Inose et al. |
| 2003/0004966 A1 | 1/2003 | Bolle et al. |
| 2003/0033347 A1 | 2/2003 | Bolle et al. |
| 2003/0033600 A1 | 2/2003 | Cliff et al. |
| 2003/0046685 A1 | 3/2003 | Srinivasan et al. |
| 2003/0050720 A1 * | 3/2003 | Kolessar ............. H04L 63/1408 381/56 |
| 2003/0056103 A1 | 3/2003 | Levy et al. |
| 2003/0070182 A1 | 4/2003 | Pierre et al. |
| 2003/0070183 A1 | 4/2003 | Pierre et al. |
| 2003/0086166 A1 | 5/2003 | Ramanujan |
| 2003/0093784 A1 | 5/2003 | Dimitrova et al. |
| 2003/0093790 A1 | 5/2003 | Logan et al. |
| 2003/0097302 A1 | 5/2003 | Overhultz et al. |
| 2003/0122708 A1 | 7/2003 | Percy et al. |
| 2003/0126593 A1 | 7/2003 | Mault |
| 2003/0131350 A1 | 7/2003 | Peiffer et al. |
| 2003/0136827 A1 | 7/2003 | Kaneko et al. |
| 2003/0146871 A1 | 8/2003 | Karr et al. |
| 2003/0156633 A1 | 8/2003 | Rix et al. |
| 2003/0163823 A1 | 8/2003 | Logan et al. |
| 2003/0171833 A1 | 9/2003 | Crystal et al. |
| 2003/0177488 A1 | 9/2003 | Smith et al. |
| 2003/0177503 A1 | 9/2003 | Sull et al. |
| 2003/0185417 A1 | 10/2003 | Alattar et al. |
| 2003/0187730 A1 * | 10/2003 | Natarajan .......... G06Q 30/0272 707/999.2 |
| 2003/0194004 A1 | 10/2003 | Srinivasan |
| 2003/0208754 A1 | 11/2003 | Sridhar et al. |
| 2003/0222819 A1 | 12/2003 | Karr et al. |
| 2003/0222820 A1 | 12/2003 | Karr et al. |
| 2003/0229900 A1 | 12/2003 | Reisman |
| 2004/0019675 A1 | 1/2004 | Hebeler, Jr. et al. |
| 2004/0025174 A1 | 2/2004 | Cerrato |
| 2004/0027271 A1 | 2/2004 | Schuster et al. |
| 2004/0031058 A1 | 2/2004 | Reisman |
| 2004/0064319 A1 | 4/2004 | Neuhauser et al. |
| 2004/0071339 A1 | 4/2004 | Loce et al. |
| 2004/0071438 A1 | 4/2004 | Harres et al. |
| 2004/0073916 A1 | 4/2004 | Petrovic et al. |
| 2004/0101071 A1 | 5/2004 | Naito |
| 2004/0122679 A1 | 6/2004 | Neuhauser et al. |
| 2004/0169581 A1 | 9/2004 | Petrovic et al. |
| 2004/0181779 A1 * | 9/2004 | Gorti .................. H04L 67/30 717/120 |
| 2004/0181799 A1 | 9/2004 | Lu et al. |
| 2004/0198386 A1 | 10/2004 | Dupray |
| 2004/0210922 A1 | 10/2004 | Peiffer et al. |
| 2004/0250281 A1 | 12/2004 | Feininger et al. |
| 2004/0255336 A1 | 12/2004 | Logan et al. |
| 2004/0266457 A1 | 12/2004 | Dupray |
| 2005/0022255 A1 | 1/2005 | Oh |
| 2005/0033579 A1 | 2/2005 | Bocko et al. |
| 2005/0035857 A1 | 2/2005 | Zhang et al. |
| 2005/0043893 A1 | 2/2005 | Hickey, Jr. |
| 2005/0114006 A1 * | 5/2005 | Fujioka ................ B62D 6/005 701/31.4 |
| 2005/0141345 A1 | 6/2005 | Holm et al. |
| 2005/0144006 A1 | 6/2005 | Oh |
| 2005/0144632 A1 | 6/2005 | Mears et al. |
| 2005/0172311 A1 | 8/2005 | Hjelt et al. |
| 2005/0177361 A1 | 8/2005 | Srinivasan |
| 2005/0200476 A1 | 9/2005 | Forr et al. |
| 2005/0201826 A1 | 9/2005 | Zhang et al. |
| 2005/0203798 A1 | 9/2005 | Jensen et al. |
| 2005/0204379 A1 | 9/2005 | Yamamori |
| 2005/0207592 A1 | 9/2005 | Sporer et al. |
| 2005/0209798 A1 | 9/2005 | Ranta |
| 2005/0216509 A1 | 9/2005 | Kolessar et al. |
| 2005/0234774 A1 | 10/2005 | Dupree |
| 2005/0243784 A1 | 11/2005 | Fitzgerald et al. |
| 2005/0264430 A1 | 12/2005 | Zhang et al. |
| 2006/0041480 A1 | 2/2006 | Briggs |
| 2006/0053110 A1 | 3/2006 | McDonald et al. |
| 2006/0075421 A1 | 4/2006 | Roberts et al. |
| 2006/0168613 A1 | 7/2006 | Wood et al. |
| 2006/0203105 A1 | 9/2006 | Srinivasan |
| 2006/0224447 A1 | 10/2006 | Koningstein |
| 2007/0011040 A1 | 1/2007 | Wright et al. |
| 2007/0020585 A1 | 1/2007 | Bjorkman et al. |
| 2007/0033608 A1 | 2/2007 | Eigeldinger |

(56) References Cited

U.S. PATENT DOCUMENTS

| | | | |
|---|---|---|---|
| 2007/0053513 A1 | 3/2007 | Hoffberg | |
| 2007/0162923 A1 | 7/2007 | Silveira Da Motta | |
| 2007/0186227 A1 | 8/2007 | Vanheuverzwyn | |
| 2007/0186228 A1 | 8/2007 | Ramaswamy et al. | |
| 2007/0220265 A1* | 9/2007 | Lemma | G06T 1/0064 380/54 |
| 2007/0271590 A1 | 11/2007 | Gulas et al. | |
| 2007/0288277 A1 | 12/2007 | Neuhauser et al. | |
| 2007/0288476 A1 | 12/2007 | Flanagan, III et al. | |
| 2007/0294057 A1 | 12/2007 | Crystal et al. | |
| 2007/0294132 A1 | 12/2007 | Zhang et al. | |
| 2007/0294705 A1 | 12/2007 | Gopalakrishnan et al. | |
| 2007/0294706 A1 | 12/2007 | Neuhauser et al. | |
| 2008/0027709 A1 | 1/2008 | Baumgarte | |
| 2008/0086304 A1 | 4/2008 | Neuhauser | |
| 2008/0101454 A1* | 5/2008 | Luff | H04N 21/25891 375/240 |
| 2008/0108297 A1 | 5/2008 | Bettinger | |
| 2008/0204273 A1 | 8/2008 | Crystal et al. | |
| 2009/0208754 A1 | 8/2009 | Chu et al. | |
| 2010/0189046 A1 | 7/2010 | Baker et al. | |
| 2021/0192562 A1 | 6/2021 | Fuhrer et al. | |

FOREIGN PATENT DOCUMENTS

| | | |
|---|---|---|
| EP | 0669070 | 12/2002 |
| EP | 0813716 | 5/2003 |
| EP | 1418692 | 5/2004 |
| EP | 1418693 | 5/2004 |
| EP | 1457889 | 9/2004 |
| EP | 1458124 | 9/2004 |
| EP | 0688487 | 10/2004 |
| EP | 1494374 | 1/2005 |
| EP | 0954934 | 3/2005 |
| GB | 2260246 | 4/1993 |
| GB | 2292506 | 2/1996 |
| JP | 2000307530 | 11/2000 |
| KR | 1095753 | 11/2001 |
| NZ | 0334026 | 8/2001 |
| WO | 8606239 | 10/1986 |
| WO | 9111062 | 7/1991 |
| WO | 9411989 | 5/1994 |
| WO | 9512278 | 5/1995 |
| WO | 9517054 | 6/1995 |
| WO | 9525399 | 9/1995 |
| WO | 9530212 | 11/1995 |
| WO | 9534166 | 12/1995 |
| WO | 9627840 | 9/1996 |
| WO | 9731440 | 8/1997 |
| WO | 9823080 | 5/1998 |
| WO | 9833333 | 7/1998 |
| WO | 9834391 | 8/1998 |
| WO | 9847298 | 10/1998 |
| WO | 9955057 | 10/1999 |
| WO | 0005134 | 2/2000 |
| WO | 0036775 | 6/2000 |
| WO | 0057643 | 9/2000 |
| WO | 0131816 | 5/2001 |
| WO | 0135676 | 5/2001 |
| WO | 0143364 | 6/2001 |
| WO | 0160071 | 8/2001 |
| WO | 0161892 | 8/2001 |
| WO | 0161987 | 8/2001 |
| WO | 0171960 | 9/2001 |
| WO | 0208945 | 1/2002 |
| WO | 0209328 | 1/2002 |
| WO | 0239235 | 5/2002 |
| WO | 0245304 | 6/2002 |
| WO | 0250760 | 6/2002 |
| WO | 0251063 | 6/2002 |
| WO | 02062009 | 8/2002 |
| WO | 02065782 | 8/2002 |
| WO | 02069082 | 9/2002 |
| WO | 02087120 | 10/2002 |
| WO | 02102079 | 12/2002 |
| WO | 03060630 | 7/2003 |
| WO | 03062960 | 7/2003 |
| WO | 03087871 | 10/2003 |
| WO | 03095945 | 11/2003 |
| WO | 03096669 | 11/2003 |
| WO | 2004036352 | 4/2004 |
| WO | 2004051303 | 6/2004 |
| WO | 2004051304 | 6/2004 |
| WO | 2004081817 | 9/2004 |
| WO | 2004105374 | 12/2004 |
| WO | 2005020456 | 3/2005 |
| WO | 2005034398 | 4/2005 |
| WO | 2005038625 | 4/2005 |
| WO | 2005094325 | 10/2005 |
| WO | 2006037014 | 4/2006 |
| WO | 2006096177 | 9/2006 |

OTHER PUBLICATIONS

National Institute of Standards and Technology, "NIST Location System," Wireless Technologies Group, retrieved from <http://www.antd.nist.gov>, retrieved Nov. 11, 2004 (2 pages).

Amplicon, UHF Radio Data Logging System-GenII Data Logger, retrieved from <http://amplicon.co.uk/dr-prod3.cfm/subsecid/10037/secid/1/groupid/11809.htm>, retrieved Oct. 4, 2004 (3 pages).

Azondekon et al., "Service Selection in Networks Based on Proximity Confirmation Using Infrared," retrieved from <http://scs.carleton.ca/~barbeau/Publications/2002/azondekon.pdf, International Conference on Telecommunications (ICT) Bejing, Jan. 2002 (5 pages).

Bahl et al., "A Software System for Locating Mobile Users: Design, Evaluation, and Lessons," Technical Report MSRTR-2000-12 Microsoft Research, retrieved from <http://research.microsoft.com/-bahl/Papers/Pdf/radar.pdf>, Feb. 2000 (13 pages).

Battiti et al., "Location-Aware Computing: a Neural Network Model for Determining Location in Wireless LANS," University of Trento: Department of Information and Communicaiton Technology, Technical Report #DIT-02-0083, Feb. 2002 (16 pages).

Bernstein et al., "An Introduction to Map Matching for Personal Navigation Assistants," New Jersey Tide Center, New Jersey Institute of Technology, Aug. 1996 (17 pages).

Canadian Intellectual Property Office, "Office Action," in connection with Canadian Patent Application No. 2,601,037, dated Apr. 20, 2012 (3 pages).

Canadian Intellectual Property Office, "Office Action," in connection with Canadian Patent Application No. 2,601,037, dated May 29, 2013 (5 pages).

Canadian Intellectual Property Office, "Office Action," in connection with Canadian Patent Application No. 2,601,037, dated Jun. 27, 2014 (4 pages).

Canadian Intellectual Property Office, "Office Action," in connection with Canadian Patent Application No. 2,601,037, dated Oct. 21, 2015 (4 pages).

Compaines and Intellectual Property Commission Republic of South Africa, "Notice of Allowance," issued in connection with South African Patent Application No. 2007/07727, dated Jan. 8, 2009 (1 page).

Cricket Project, "Cricket v2 User Manual," Mit Computer Science and Artificial Intelligence Lab, Cambridge, U.S.A., Jan. 2005 (57 pages).

Directions Magazine, "University Library Navigation Enabled by Ekahau," Jun. 12, 2003, retrieved from <http://www/directionsmag.com/press.releases.index.php?duty=Show&id=7276&trv=1>, retrieved Aug. 3, 2007 (2 pages).

Discovery Communications Inc., "Discover Spy Motion Tracking system," retrieved from <http://shopping.discovery.com/stores/serlet/ProductDisplay?catalogId=10000&storeId=10000&lan=1&productId=53867&partnumber=689638>, retrieved Oct. 14, 2004 (3 pages).

Dust Networks Inc., "Dust Networks—SmartMesh," retrieved from <http://dustnetworks.com>, retrieved on Sep. 29, 2004 (2 pages).

(56) References Cited

OTHER PUBLICATIONS

Eltek Ltd, "Eltek GenII Radio Data Logging System," retrieved from <http://www.elteckdataloggers.co.uk>, retrieved on Sep. 29, 2004 (4 pages).
European Patent Office, "European Search Report," issued in connection with European Patent Application No. 14004084.1, dated Feb. 13, 2015 (8 pages).
European Patent Office, "Communication Pursuant to Article 94(3) Epc," issued in connection with European Patent Application No. 05724978.1, dated Jan. 25, 2013 (6 pages).
European Patent Office, "Communication Pursuant to Article 94(3) EPC," issued in connection with European Patent Application No. 05724978.1, dated Sep. 11, 2012 (7 pages).
European Patent Office, "Supplementary European Search Report," in connection with European Patent Application No. 05724978, dated Jan. 28, 2008 (2 pages).
Exxun, "X1 Button Radio—the World's Smallest Radio," retrieved from <http://exxun.com>, retrieved Sep. 29, 2004 (2 pages).
Fang et al., "Design of a Wireless Assisted Pedestrian Dead Reckoning System—The NavMote Experience," IEEE Transactions on Instrumentation and Measurement, vol. 54, No. 6, Dec. 2005 (17 pages).
Ferguson, "Notes from Sand Hill—Xtension Tech Notes," Sand Hill Engineering Inc., Dec. 10, 1998, retrieved from <http://shed.com/articles/TN.proximity.html>, retrieved on Jan. 12, 2004 (9 pages).
Gentile et al., "Robust Location Using System Dynamics and Motion Contraints," National Institute of Standards and Technology, Wireless Communication Technologies Group, Jun. 24, 2004 (5 pages).
Handy et al., "Lessons Learned From Developing a Bluetooth Multiplayer-Game," Jan. 2004, Institute of Applied Microelectronics and Computer Science, University of Rostock (7 pages).
Holm, "Detect & Position Seminar," Sonitor Technologies, May 26, 2004, retrieved from <http://www.sonitor.com/news/article.asp?id=62>, Sonitor Technologies, retrieved Oct. 13, 2004 (16 pages).
Radio Shack, "FM Wireless Microphone Module Kits," p/n 28/4030, retrieved from <http://www.horizonindustries.com/fm.htm>, retrieved Sep. 30, 2004 (1 page).
Instituto Mexicano De La Propiedad Industrial, "Office Action," issued in connection with Mexican Patent Application No. Mx/a/2007/011127, dated Nov. 11, 2009 (2 pages).
International Preliminary Examination Authority, "International Preliminary Examination Report," issued in connection with International Patent Application No. PCT/US2005/07562, dated Nov. 2, 2006 (4 pages).
International Searching Authority, "International Search Report and Written Opinion," issued in connection with International Patent Application No. PCT/US2005/07562, dated Mar. 2, 2006 (9 pages).
International Bureau, "Preliminary Report on Patentability," issued in connection with International Patent Application No. PCT/US2005/34743, dated Apr. 5, 2007 (9 pages).
International Searching Authority, "International Search Report and Written Opinion," issued in connection with International Patent Application No. PCT/US05/34743, dated Oct. 31, 2006 (11 pages).
IP Australia, "Examination Report No. 1," issued in connection with Australian Patent Application No. 2009250975, dated Aug. 19, 2010 (1 page).
IP Australia, "Examination Report No. 2," issued in connection with Australian Patent Application No. 2005328684, dated Jan. 15, 2010 (2 pages).
IP Australia, "Examination Report No. 1," issued in connection with Australian Patent Application No. 2005328684, dated May 15, 2009 (2 pages).
Kanellos, "Dust Makes Mesh of Wireless Sensors," CNET News.com, Sep. 20, 2004, retrieved from <http://www.nes.com/Dust-makes-mesh-of-wireless-sensors/2100-1008_3-5374971.html?tag=item>, retrieved on Sep. 29, 2004 (2 pages).
Kerschbaumer, "Who's Really Watching?," Reed Business Information, a Division of Reed Elsevier, Inc., May 16, 2005 (4 pages).
McCarthy et al., "RF Free Ultrasonic Positioning (Presentation)," 7th International Symposium on Wearable Computers, Oct. 2003 (12 pages).
McCarthy et al., "RF Free Ultrasonic Positioning," Department of Computer Science, University of Bristol, U.K., Oct. 2003 (7 pages).
Norris, "ATC American Technology Corporation-Retailer Ads: AM & FM Sounds," revised May 4, 2004, retrieved from <http://www.woodynorris.com>, retrieved on Sep. 29, 2004 (3 pages).
Schuman, "A Smarter Smart Cart?" Evan Schuman's Storefront Backtalk, Feb. 16, 2005, retrieved from <http://www.storefrontbacktalk.com>, retrieved on Nov. 20, 2006 (5 pages).
Sonitor Technologies, "New Sonitor Patent Combines Ultrasound and RFID," Feb. 17, 2005, retrieved from <http://sonitor.com/news/article.asp?id=73>, retrieved on Jun. 13, 2005 (1 page).
University of California Los Angeles, "The Nibble Location System," updated May 21, 2001, retrieved from <http://mmsl.cs.ucla.edu/nibble/>, retrieved on Nov. 2, 2004 (13 pages).
United States Patent and Trademark Office, "Elections/Restriction Requirements," issued in connection with U.S. Appl. No. 11/852,049, dated Apr. 14, 2010 (5 pages).
United States Patent and Trademark Office, "Final Office Action," issued in connection with U.S. Appl. No. 11/852,049, dated Aug. 29, 2012 (9 pages).
United States Patent and Trademark Office, "Final Office Action," issued in connection with U.S. Appl. No. 11/852,049, dated Jan. 6, 2011 (5 pages).
United States Patent and Trademark Office, "Final Office Action," issued in connection with U.S. Appl. No. 11/852,049, dated Sep. 30, 2011 (7 pages).
United States Patent and Trademark Office, "Non-Final Office Action" issued in connection with U.S. Appl. No. 13/776,402, dated Aug. 15, 2013 (7 pages).
United States Patent and Trademark Office, "Non-Final Office Action," issued in connection with U.S. Appl. No. 11/852,049, dated Apr. 14, 2011 (5 pages).
United States Patent and Trademark Office, "Non-Final Office Action," issued in connection with U.S. Appl. No. 11/852,049, dated Jul. 22, 2010 (5 pages).
United States Patent and Trademark Office, "Non-Final Office Action," issued in connection with U.S. Appl. No. 11/852,049, dated Mar. 29, 2012 (6 pages).
United States Patent and Trademark Office, "Notice of Allowance" issued in connection with U.S. Appl. No. 13/776,402, dated Feb. 6, 2014 (8 pages).
United States Patent and Trademark Office, "Notice of Allowance," issued in connection with U.S. Appl. No. 11/852,049, dated Dec. 3, 2012 (9 pages).
United States Patent and Trademark Office, "Non-Final Office Action," issued in connection with U.S. Appl. No. 14/141,641, dated Mar. 27, 2015 (8 pages).
United States Patent and Trademark Office, "Non-Final Office Action," issued in connection with U.S. Appl. No. 14/141,641, dated Sep. 15, 2014 (7 pages).
United States Patent and Trademark Office, "Notice of Allowance," issued in connection with U.S. Appl. No. 14/141,641, dated Jul. 30, 2015 (8 pages).
Wagner, "Global Positioning System for Personal Travel Surveys—Lexington Area Travel Data Collections Test," Final Report for Office of Highway Information Management, Office of Technology Application and Federal Highway Administration, Sep. 15, 1997 (92 pages).
Yahoo Shopping, "Arkon Sound Feeder II FM Transmitter," retrieved from <http://store.yahoo/semsons-inc/arsoundfeedii.html>, retrieved Oct. 4, 2004 (2 pages).
Yahoo Shopping, "World's Smallest Hands Free Radio," retrieved from <http://store.yahoo/latesttrends/worsmalhanfr.html>, retrieved Sep. 29, 2004 (1 page).
Yeung et al., "A Comparative Study on Location Tracking Strategies in Cellular Mobile Radio Systems," Global Telecommunications Conference, IEEE, vol. 1, Nov. 14-26, 1995 (7 pages).
United States Patent and Trademark Office, "Notice of Allowance," issued in connection with U.S. Appl. No. 11/966,414, dated Sep. 9, 2020 (10 pages).

(56) References Cited

OTHER PUBLICATIONS

United States Patent and Trademark Office, "Decision on Appeal," issued in connection with U.S. Appl. No. 11/966,414, dated Aug. 14, 2020 (10 pages).

United States Patent and Trademark Office, "Examiner's Answer to Appeal Brief," issued in connection with U.S. Appl. No. 11/966,414, dated May 1, 2019 (8 pages).

United States Patent and Trademark Office, "Final Office Action," issued in connection with U.S. Appl. No. 11/966,414, dated Jun. 26, 2018 (28 pages).

United States Patent and Trademark Office, "Non-Final Office Action," issued in connection with U.S. Appl. No. 11/966,414, dated Dec. 4, 2017 (24 pages).

United States Patent and Trademark Office, "Final Office Action," issued in connection with U.S. Appl. No. 11/966,414, dated Jun. 9, 2016 (38 pages).

United States Patent and Trademark Office, "Non-Final Office Action," issued in connection with U.S. Appl. No. 11/966,414, dated Sep. 1, 2015 (23 pages).

United States Patent and Trademark Office, "Final Office Action," issued in connection with U.S. Appl. No. 11/966,414, dated Jul. 13, 2012 (56 pages).

United States Patent and Trademark Office, "Non-Final Office Action," issued in connection with U.S. Appl. No. 11/966,414, dated Jun. 27, 2011 (38 pages).

White, "How Computers Work," $7^{th}$ Edition, Que Publishing, first published Oct. 15, 2003 (23 pages).

United States Patent and Trademark Office, "Non-Final Office Action," issued in connection with U.S. Appl. No. 17/138,475, dated Oct. 3, 2022 (9 pages).

United States Patent and Trademark Office, "Notice of Allowance," issued in connection with U.S. Appl. No. 17/138,475, dated Nov. 4, 2022 (8 pages).

United States Patent and Trademark Office, "Corrected Notice of Allowability," issued in connection with U.S. Appl. No. 17/138,475, dated Nov. 28, 2022 (5 pages).

\* cited by examiner

| AD ID # | CHARACTERISTIC | CHARACTERISTIC VALUE | CODES X-MITTED | CODES DETECTED | RATIO |
|---|---|---|---|---|---|
| 1 | # of embedded codes | 1 | 30 | 27 | 0.9 |
| 1 | # of embedded codes | 2 | 40 | 28 | 0.7 |
| 1 | # of embedded codes | 3 | 60 | 36 | 0.6 |
| 2 | # of embedded codes | 1 | 30 | 24 | 0.8 |
| 2 | # of embedded codes | 2 | 40 | 24 | 0.6 |
| 2 | # of embedded codes | 3 | 60 | 30 | 0.5 |
| 3 | # of embedded codes | 1 | 30 | 21 | 0.7 |
| 3 | # of embedded codes | 2 | 40 | 20 | 0.5 |
| 3 | # of embedded codes | 3 | 60 | 24 | 0.4 |
| 4 | # of embedded codes | 1 | 30 | 18 | 0.6 |
| 4 | # of embedded codes | 2 | 40 | 16 | 0.4 |
| 4 | # of embedded codes | 3 | 60 | 12 | 0.2 |
| 1 | Volume level | 30 dB | 10 | 7 | 0.7 |
| 1 | Volume level | 35 dB | 10 | 8 | 0.8 |
| 1 | Volume level | 40 dB | 10 | 9 | 0.9 |
| 2 | Volume level | 30 dB | 10 | 6 | 0.6 |
| 2 | Volume level | 35 dB | 10 | 7 | 0.7 |
| 2 | Volume level | 40 dB | 10 | 8 | 0.8 |
| 1 | Ambient noise | 30 dB | 10 | 6 | 0.6 |
| 1 | Ambient noise | 35 dB | 10 | 5 | 0.5 |
| 1 | Ambient noise | 40 dB | 10 | 4 | 0.4 |
| 2 | Ambient noise | 30 dB | 10 | 8 | 0.8 |
| 2 | Ambient noise | 35 dB | 10 | 7 | 0.7 |
| 2 | Ambient noise | 40 dB | 10 | 3 | 0.3 |

| AD DETECTION RATE BY SCORE |
|---|
| A = 0.91 |
| B = 0.87 |
| C = 0.85 |
| D = 0.80 |
| E = 0.70 |
| F = 0.60 |

Highest Detection Rate → A = 0.91

Lowest Detection Rate → F = 0.60

| SCALING FACTORS NORMALIZING TO CATEGORY A |
|---|
| A = 1.00 |
| B = 1.04 |
| C = 1.07 |
| D = 1.14 |
| E = 1.30 |
| F = 1.52 |

| SCALING FACTORS NORMALIZING TO 100% |
|---|
| A = 1.10 |
| B = 1.15 |
| C = 1.18 |
| D = 1.25 |
| E = 1.43 |
| F = 1.67 |

FIG. 4C

SYSTEMS AND METHODS TO PRE-SCALE MEDIA CONTENT TO FACILITATE AUDIENCE MEASUREMENT

RELATED APPLICATIONS

This application is a continuation of U.S. patent application Ser. No. 17/138,475, filed Dec. 30, 2020, which is a continuation of U.S. patent application Ser. No. 11/966,414, filed Dec. 28, 2007, which claims the benefit of U.S. Provisional Patent Application No. 60/882,695, filed Dec. 29, 2006. The entireties of U.S. patent application Ser. Nos. 17/138,475, 11/966,414, and U.S. Provisional Patent Application No. 60/882,695 are hereby incorporated by reference herein.

FIELD OF THE DISCLOSURE

The present disclosure relates generally to audience measurement, and, more particularly, to systems and methods to pre-scale media content to facilitate audience measurement.

BACKGROUND

Consuming media presentations (e.g., audio and/or video presentations) generally involves listening to audio information and/or viewing video information. Media presentations may include, for example, radio programs, music, television programs, radio or television commercials, movies, still images, etc. Media-centric companies such as, for example, advertising companies, broadcast networks, media researchers, etc. are often interested in the viewing and/or listening interests of audience members to better market their products and/or to improve their programming. Prior to investigating and/or otherwise studying viewing and/or listening habits, media researchers first need to determine/identify which media content was viewed.

Automatically determining the identity of which media content is being played by a media device is typically determined with audience measurement equipment, such as metering devices, tags, and/or portable personal meters. Such meters are typically configured to monitor media consumption (e.g., viewing and/or listening activities) to determine an identity of the media content being presented. For example, one technique of determining which media content is being presented to an audience member involves detecting or collecting information, such as program and/or station identification codes embedded in audio and/or video signals that are tuned by media presentation devices (e.g., televisions, stereos, speakers, set top boxes, computers, video display devices, video games, mobile telephones, etc.).

BRIEF DESCRIPTION OF THE DRAWINGS

FIG. 3 is a portion of an example advertisement detection table of the example system of FIG. 1.

FIGS. 4A through 4C are example scaling factors employed by the example system of FIG. 1.

DETAILED DESCRIPTION

Although a particular segment of media content may be played at a household in the presence of a metering device, the metering device may not detect one or more of the codes embedded therein. Any number of factors may influence the detectability of an embedded code such as, for example, ambient noise conditions or the type of media content in which the code is embedded. As such, the actual number of times codes are carried by media content presented may not equal the number of times the metering device(s) detect such codes.

Figure 1:
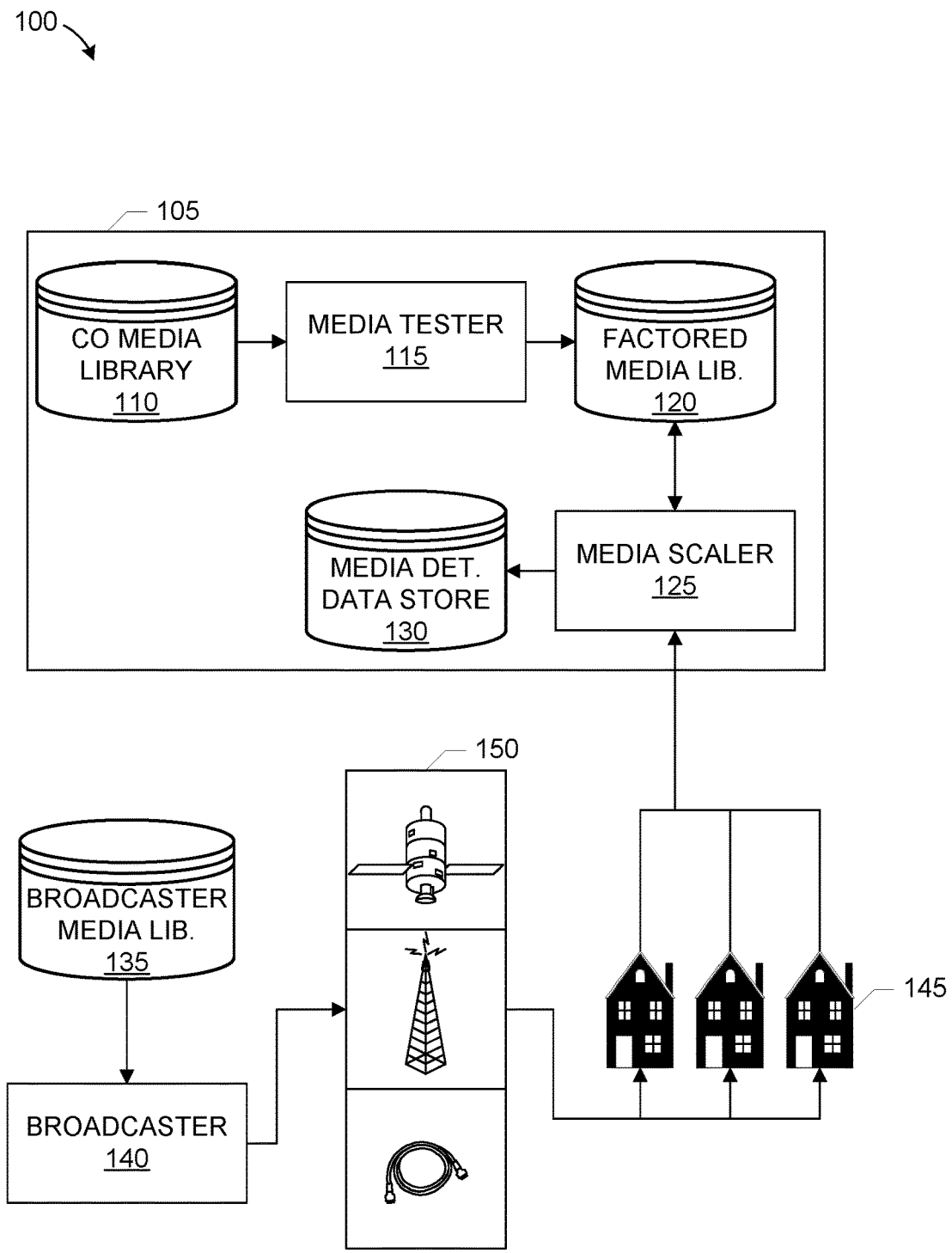
FIG. 1 is a schematic diagram of an example system to pre-scale media content to facilitate audience measurement.

Referring now to FIG. 1, an example system 100 to pre-scale media content is shown. More specifically, in order to determine whether a monitored audience member (e.g., a person in a monitored household and/or a person carrying a personal/portable people meter equipped to collect watermarks (e.g., embedded audio codes)), audience measurement companies, content providers, media researchers, and/or broadcasters embed audio codes within the media content (e.g., one or more programs (television and/or radio), advertisement(s) (e.g., commercials), etc.) to be monitored. The codes are embedded such that they are spaced (though not necessarily equally) in time throughout the program and/or advertisement. The audience measurement company collects the codes detected. The codes are compared to a database of codes to identify the content with which they are associated. Further, the number of collected codes associated with particular content are counted (i.e., summed) to determine if the audience member was sufficiently exposed to the program to consider the corresponding program and/or advertisement as having been consumed. However, not all programs and/or advertisements have the same characteristics. As a result, some programs and/or advertisements traditionally carry greater numbers of codes than others, thereby making it more likely to credit consumption of some programs and/or advertisements (e.g., those with more codes) than other programs and/or advertisements. The example system 100 addresses this issue by pre-scaling the programs and/or advertisements to equalize the likelihood of detecting the differing programs and/or advertisements.

The example system 100 of FIG. 1 includes a central office 105, which includes a central office media library 110, a media tester 115, a factored media library 120, a media scaler 125, and a revised media detection data store 130. The example system 100 of FIG. 1 also includes a broadcast media library 135, and a broadcaster 140 that transmits media content to households 145 via one or more transmission routes 150. The transmission routes 150 may include, but are not limited to, radio frequency (RF) transmission, Internet transmission, wireless (e.g., cellular) transmission, cable transmission, and/or satellite transmission. The central office (CO) 105 media library 110 stores one or more types of media programming provided by an entity (e.g., a broadcaster, a marketing entity, a manufacturer, a merchant, etc.) interested in audience behavior information. Such audience behavior information may include viewer identity, demographics, tuned broadcast programming channels, tuned movies, tuned advertisements, ambient conditions of the audience, audio/visual (A/V) channel and/or volume changes, to name a few.

Generally speaking, the marketing entity, broadcaster, and/or other entity interested in advertisement effectiveness and/or interested in determining media content exposure looks to an audience measurement company to capture and provide such information. The audience measurement company employs audience measurement equipment to determine whether media content is exposed to and/or consumed by audience members in monitored households (the households are typically statistically selected to represent one or more population segments of interest). For example, media content (e.g., television programs, advertisements, etc.) that draws a large audience may demand higher payments for advertising time than media content that has a smaller audience. Similarly, advertisement effectiveness (reach) may be determined, in part, by determining how many times the advertisement is presented in a household as detected by audience measurement equipment.

Advertisement detection is facilitated by inserting codes within the audio and/or video portions of an A/V signal corresponding to the advertisement. The broadcast provider, marketing entity, and/or audience measurement company may insert such codes (encode) within the media content in a manner that is not detectable to an audience member. For example, the broadcast provider may insert audio codes within one or more portions of the media program and/or advertisement during moments where they will be masked from human hearing by the sound of the program. It is generally more difficult to embed such audio codes during certain types of programming. For instance, it is difficult to embed audio codes during periods of silence or in monotonic-type sounds, because such audio codes will more likely be heard during such periods. Example methods for adding codes to an audio signal are described in U.S. Pat. No. 6,272,176, entitled "Broadcast Encoding System and Method," filed on Jul. 16, 1998; and U.S. Pat. No. 6,968,564, entitled "Multi-Band Spectral Audio Encoding," and filed on Apr. 6, 2000. U.S. Pat. Nos. 6,272,176 and 6,968,564 are each hereby incorporated by reference in their entirety.

Audience measurement equipment at monitored locations attempts to sense and/or decode the embedded codes presented via a tuned program and/or advertisement. The codes are typically unique and contain and/or reference identification information to identify the program and/or advertisement in which they are embedded. Some codes may identify related program and/or advertisement versions if the broadcaster develops multiple programs and/or advertisements (e.g., advertisements specific to one or more geographic and/or demographic groups). Additionally, multiple layers of codes may be embedded within media content and/or advertisements such as, for example, codes embedded by national broadcasters, codes embedded by local broadcasting affiliates, and/or codes embedded by the content provider. As a result, opportunities to embed codes within the media content may be limited by these competing codes, and/or by the content of the program and/or advertisement (e.g., by times of relative quietness). This problem of limited opportunities to embed codes in an undetectable manner is particularly great in the context of advertisements because advertisements are typically shorter in duration. Some advertisements are as short as five seconds in duration.

Successfully detecting audio codes embedded in advertisements depends on several factors, including, but not limited to, the audio characteristics of the advertisement content and/or the audio characteristics of the ambient environment in which the advertisement is presented. For example, advertisements having periods of relative silence typically have fewer embedded codes to ensure that audience members do not hear the codes. Additionally or alternatively, advertisements having monotone characteristics are also difficult to imperceptibly encode because the inserted codes may stand out against the monotone background. Thus, advertisements with monotone characteristics also contain relatively fewer codes than advertisements of similar duration, but having louder or more varied audio tracks. As a result, the audio codes embedded in some advertisements presented by A/V equipment (e.g., a television, a radio, etc.) in an audience member's household may not be detected because of ambient noise conditions, monotone characteristics of the advertisement, silence characteristics of the advertisement, the audio spectral capabilities of the A/V equipment, and/or a high density of code layers embedded within the advertisement.

In the illustrated example, the marketing entity, broadcaster, and/or other entity interested in determining advertisement effectiveness provides media content (e.g., one or more advertisements, portions of advertisements, portions of movies, portions of sitcoms, etc.) to the CO 105 for testing to determine the media content's code masking capabilities. The code masking capabilities may be represented by way of a scaling factor and/or a ratio of embedded versus detected codes to establish a detectability factor. In operation, the advertisement and/or other media content is provided to the media tester 115 to determine the masking capabilities and/or the detection capabilities of the advertisement, and assign that advertisement a scaling factor based on that determined detectability. As discussed in further detail below, the media tester 115 plays/transmits the advertisement in/to a controlled environment to determine the difficulty of detecting audio codes embedded therein. For instance, the media tester 115 transmits the advertisement a number of times and attempts to detect and count the audio codes embedded therein. Based upon the number of times the code(s) of the advertisement were emitted by the A/V equipment (e.g., a television), which is known in advance from the encoding entity, versus the number of times the code(s) were actually detected by the audience measurement equipment/device(s), the media tester 115 calculates and assigns a scaling factor to the advertisement. The scaling factor is a value that indicates, adjusts, and/or scales a number of codes that must be detected during presentation of an advertisement by an audience measurement device to consider the advertisement as having been detected. Advertisements with relatively poor audio masking capabilities will have relatively fewer audio codes and, thus, can be counted as presented when a lower number of codes are detected than advertisements having relatively higher audio masking capabilities. The scaling factor assigned to the advertisements is indicative of these and/or other characteristics and, thus, enable the audience measurement entity to more accurately count the presence of the advertisements.

In the illustrated example, the media content are saved with the corresponding scaling factor(s) in the factored media library 120 (e.g., database, a scaling factor library), for later recall and application of the scaling factor(s) to actual measurement data collected from one or more measurement sites 145 (e.g., households and/or portable meters (e.g., personal-people meters, cell-phone based meters, etc.). For example, the broadcaster 140, such as a local affiliate, retrieves an advertisement from the broadcaster media library 135. In the illustrated example, the particular advertisement selected by the broadcaster is one of the advertisements previously tested by the CO 105.

Additionally or alternatively, the media tester 115 may suggest encoding configuration(s) and/or forward one or more preferred versions of the encoded advertisement to the example broadcaster media library 135. For example, the media tester 115 may perform multiple tests on a particular media sample (e.g., the advertisement) in which each test encodes the media sample with a different encoding configuration. As described in further detail below, an encoding configuration may include one or more characteristics that affect a likelihood or ability of embedded codes being detected by detection equipment. Characteristics include, but are not limited to, a media sample playback volume, a media sample encoding volume, an ambient noise volume, and a media sample encoding density (e.g., the number of separate codes embedded within the media sample). To that end, the media sample may have more than one associated scaling factor (e.g., one for each encoding configuration). After the media sample is tested under one or more of the aforementioned permutations of characteristics, the media tester 115 may select a preferred encoding configuration and send the associated encoded media sample (or an identification of the preferred encoding configuration if encoding is to be done elsewhere) to the broadcaster media library 135 to be used for broadcasting.

The audience measurement equipment in the field (e.g., at the example household 145) records and time stamps detected codes. The collected data is returned to the CO 105. Detection counts (e.g., the number of codes detected for a given interval of time during a given period of media content) are then calculated and forwarded to the media scaler 125. The media scaler 125 parses advertisement identification information received from the field (e.g., the household 145) and queries the factored media library 120 to receive the scaling factor(s) corresponding to the detected code(s). In the illustrated example, the media scaler 125 applies a received scaling factor to the detection count (e.g., the number of codes counted) of an advertisement detected in the field (e.g., the household 145) and saves the result as a revised detection count to the media detection data store 130. The revised detection count is then compared to a threshold to determine whether to credit the advertisement as having been presented and/or consumed.

Figure 2:
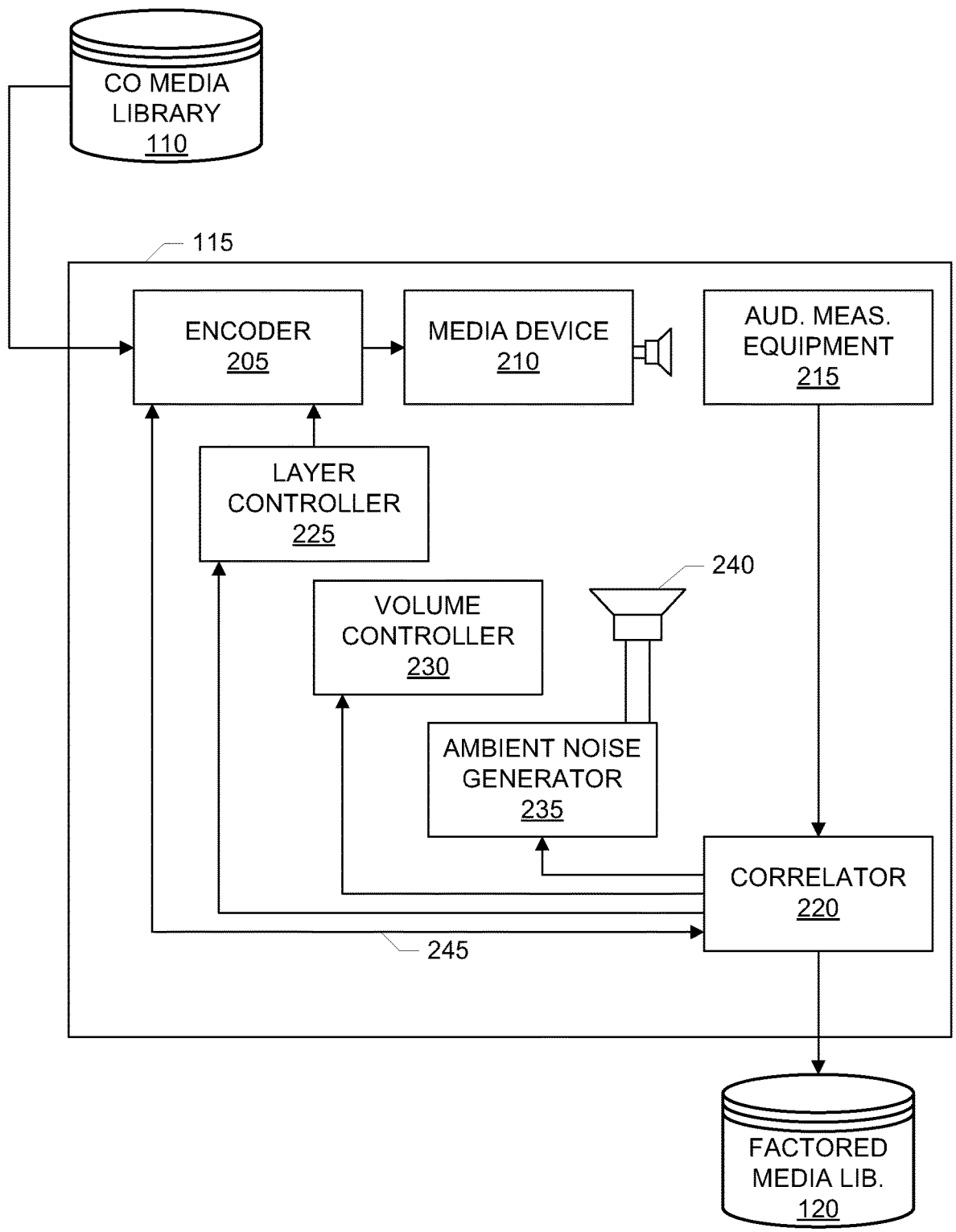
FIG. 2 is a more detailed illustration of the media tester of FIG. 1.

FIG. 2 illustrates the example media tester 115 of FIG. 1 in greater detail. The example media tester 115 calculates scaling factors of media content. In the illustrated example, the media tester 115 provides a controlled environment in which A/V equipment may present the media content to example audience detection equipment. The example media tester 115 includes an encoder 205 to embed one or more codes in the media content received from the CO media library 110 (of course, the encoder 205 may be eliminated if the content is pre-coded). The encoded media content is then provided to a media device 210, such as a television and/or a radio, which plays and/or transmits the media content in the controlled environment of the media tester 115. A detector and/or audience measurement equipment 215 receives the media content played/transmitted by the media device 210 and attempts to extract codes (e.g., audio codes) therefrom. Any extracted codes are provided to a correlator 220, which stores the code(s) and/or the number of codes detected by the audience measurement equipment 215. In the illustrated example, the correlator 220 also stores the number of codes actually transmitted to the media device 210 by the encoder 205, thereby allowing the correlator 220 to determine a ratio between the number of transmitted codes and the number of detected codes. This ratio between the total number of codes inserted and the number of codes detected during the duration of the program is used to assign a scaling factor to the media content. Although in the illustrated example the scaling factor is a ratio, it may be represented in any other desired fashion (e.g., as a difference, etc.).

As described above, more than one scaling factor may be associated with a particular piece of media content such as an advertisement. For example, a first scaling factor associated with media content (e.g., an advertisement) may be based on the number of embedded codes therein. Generally speaking, a higher scaling factor may be applied to an advertisement having many layers of embedded codes because such multilayered codes impose a greater challenge for the audience measurement equipment to detect. For example, an advertisement presented in a first geographic market may include a program identification code and a code embedded by a national broadcaster (e.g., NBC, CBS, etc.). On the other hand, that same advertisement presented in a second geographic market may include an additional code embedded by a local broadcaster, thereby increasing a code density of the advertisement. Based on which geographic market the advertisement is presented, a corresponding first or second scaling factor may be applied to the advertisement.

Additionally or alternatively, a second scaling factor may be associated with the advertisement based on the volume of the audience member's media device 210. Unlike the factor of the number of embedded codes in an advertisement, the volume of the audience member's media device 210 (e.g., television) is not directly based on the advertisement content itself. Nonetheless, this factor plays a part in the ability of audience measurement equipment to detect audio codes embedded therein. For example, media content that is presented at a higher volume may have a better chance of being detected by the audience measurement equipment 215, thereby resulting in a lower scaling factor. On the other hand, media content that is presented at a lower volume presents a greater challenge to the audience measurement equipment 215, thereby resulting in a higher scaling factor. Information relating to volume settings and/or changes (e.g., household environmental conditions) may be detected by the audience measurement equipment 215 at the monitored site. In the event that the audience measurement equipment 215 can determine that the advertisement is being presented at a particular volume level (e.g., a microphone to detect/measure a volume power level in dBm), then a corresponding scaling factor may be selected based on the measured advertisement presentation volume level and applied when making crediting determinations.

A third example scaling factor may be associated with the advertisement based on the ambient noise conditions of the audience member's household. For example, households having loud background noises, dogs barking, party activities, and/or other ambient acoustic noise conditions, present greater detection challenges for the audience measurement equipment 215. As such, a third example scaling factor may be calculated and applied for use when facing such detection challenges. As with the second scaling factor, the third scaling factor is a function of the monitored site, not a function of the advertisement per-se, and is, thus, based on conditions detected at play back at the monitored site. In operation, the advertisement may be associated with any number of scaling factors, each scaling factor associated with a corresponding background noise level (e.g., a noise level measured by a microphone in dBm) detected by the audience measurement equipment 215. Any number of characteristics and/or parameters may play a significant part in the ability of audience measurement equipment 215 to detect audio codes embedded within media content. Furthermore, a relatively large number of permutations of one or more characteristics may result in a large number of potential scaling factors, depending on both the advertisement content itself, the encoding configuration employed, and/or the environment in which the advertisement is presented.

To simulate one or more characteristics/parameters that may have an effect on advertisement code detection, the example media tester 115 includes a layer controller 225, a volume controller 230, and an ambient noise generator 235 operatively connected to a speaker 240. In the illustrated example, the correlator 220 controls one or more aspects of the encoder 205, the layer controller 225, the volume controller 230, and/or the ambient noise generator 235 to establish one or more conditions that permit a scaling factor to be computed. For example, the correlator 220 may instruct the layer controller 225 to identify a single code to be embedded into the media content via the encoder 205. One or more codes may be provided by a broadcaster so that the media tester 115 may encode the advertisement with such code(s) in a number of different configurations. As a result, the example media tester 115 can run through any number of encoding configuration permutations and determine a preferred configuration based on empirical results of the highest transmitted-to-detected code ratio. In operation, the correlator 220 runs through a number of iterations, such as, for example, ten attempts of presenting an advertisement with a single type (e.g., one layer) of embedded code (e.g., the code provided by the broadcaster). The correlator 220 maintains a list of the number of transmitted codes by monitoring encoding activity of the encoder 205 (via a data line 245), and maintains a list of the number of detected codes by monitoring the audience measurement equipment 215. If the ratio of detected codes to transmitted codes is relatively high (e.g., 9 out of 10 codes detected), then the correlator 220 stores a scaling factor (based on this measured ratio), which may be applied to the advertisement when only a single code is embedded therein, as described in further detail below. The particular techniques and/or mathematics used to calculate the scaling factor may be designed by a user of the media tester 115 and stored in a memory associated with the correlator 220.

In another example, the correlator 220 instructs the layer controller 225 to embed two different types (or layers) of codes into the media content via the encoder 205. For example, the two codes may include one code associated with the program identifier, and another code associated with a national broadcaster (e.g., a code indicative of NBC, CBS, etc.) In operation, the correlator 220 may run through, for example, ten attempts of presenting an advertisement with the two embedded codes and maintain a list of transmitted codes and detected codes. If the ratio of detected codes to transmitted codes is somewhat lower than the example in which only a single code is embedded into the advertisement, then a corresponding lower scaling factor may be associated to the advertisement. Therefore, in this example, the same advertisement has at least two associated scaling factors, one of which is used when the advertisement contains a single layer of embedded code(s), and another scaling factor used when the advertisement contains two (or more) layers of embedded codes. Typically the broadcaster will know that the advertisement should have a certain number of codes embedded therein based on the presentation location (e.g., geographic location of presentation). A first geographic location may be scheduled to broadcast the advertisement with a single type of code (e.g., a National code spaced throughout the advertisement every six seconds), while a second geographic location may be scheduled to broadcast the advertisement with both a national code and a local affiliate code. Based on the locality of where the advertisement is presented, a corresponding scaling factor is associated with the advertisement so that a corrected detection count may be calculated. Any number of scaling factors may be tested-for, and associated-with an advertisement based on one or more permutations of code layers, volume levels, ambient noise conditions, and/or other characteristics that may affect code detection. For example, different scaling factors may be calculated for the advertisements based on the type of audience measurement equipment 215 that is operating in any particular household 145.

In yet another example, the correlator 220 instructs the volume controller 230 to embed the codes identified by the layer controller 225 at at least one predetermined encoding volume level. For example, by virtue of the volume controller 230 setting a particular encoding volume (e.g., a volume level measured in decibels, a volume level measured in dBm, etc.), corresponding media content scaling factors may be calculated by the media tester 115. Generally speaking, higher encoding volumes correspond to better detectability by the audience measurement equipment 215. Additionally or alternatively, the example volume controller 230 establishes at least one volume level of the ambient noise generator 235, thereby allowing the media tester 115 to determine corresponding scaling factors when ambient noise is included in the testing environment.

FIG. 3 illustrates an example table 300 of advertisement detection results generated by the example correlator 220. The example table 300 includes an advertisement identification column 305 to identify which advertisement was measured, a characteristic column 310 to describe which characteristic of the advertisement was measured, a characteristic value 315, a codes transmitted column 320, a codes detected column 325, and a scaling factor column 330. In the illustrated example table 300, a first row 335 illustrates that a first advertisement (i.e., Ad ID #1) 340 was measured in view of the number of types of embedded codes 345 (e.g., an encoding density). The characteristic value column 315 illustrates that a single type of code was embedded (e.g., a program identification code that is spaced once every six seconds throughout the advertisement), and the advertisement was transmitted ten times, as illustrated by the codes transmitted column 320. If each advertisement is twenty seconds in duration, then three codes should be detected each time the advertisement is presented. Accordingly, presentation/transmission of the advertisement ten times includes thirty opportunities for the audience measurement equipment 215 to detect the codes.

As shown in the illustrated example of FIG. 3, of the thirty codes transmitted, the codes detected column 325 illustrates that twenty-seven were received, resulting in a ratio of 0.9. Similarly, rows 350 and 355 illustrate results when two types of codes (e.g., a program identification code and a national broadcaster code, each presented once every ten seconds) and three types of codes (e.g., a program identification code, a national broadcaster code, and a local affiliate code, each presented once every ten seconds) are embedded into the advertisement, respectively. Thus, for the same example twenty-second advertisement, row 350 illustrates that four codes should, ideally, be detected each time the advertisement is presented, for a grand total of 40 codes (column 320)

in the event the advertisement is iterated ten times during the test. Similarly, for the same example twenty-second advertisement in which three codes are embedded for each ten second time period (row 355), a total of six codes should, ideally, be detected each time the advertisement is presented. This results in a grand total of 60 codes (column 320) in the event that the advertisement is iterated ten times during the test. Generally speaking, the example table 300 of FIG. 3 illustrates that each advertisement may exhibit substantially different detectability results. In particular, advertisement number four (column 305) illustrates a relatively lower detection ratio (column 330) than advertisement number one.

The example table 300 also illustrates detection results for other characteristics, such as for one or more volume levels 360 and for one or more ambient noise conditions 365. As described above, characteristics relating to the volume level of the presented media content and/or the ambient noise in which the media content is presented are not inherently related to the media content itself. However, the example media tester 115 allows the user to run through one or more permutations (e.g., of the volume level and/or ambient noise conditions) to establish corresponding scaling factors. As discussed in further detail below, such scaling factors may be applied to the detected media content after, for example, the audience measurement equipment determines the parameters of the ambient conditions (e.g., the audience member's television volume level in decibels and/or the audience member's ambient noise level in decibels).

FIGS. 4A, 4B, and 4C illustrate example scaling factor calculations. While the example scaling factor calculations may be based on the data acquired by the correlator 220 as shown in the example table 300 of FIG. 3, the example values shown in FIGS. 4A, 4B, and 4C are unrelated to the example data shown in FIG. 3. Instead, the example values shown in FIG. 4A illustrate the upper and lower extreme detection capabilities for one or more advertisements. FIG. 4A illustrates an example six-way category of average detection rates 400 ranging from category "A", for the highest average detection rates (i.e., advertisements in which the embedded codes were most successfully detected), to category "F" for the lowest average detection rates. In particular, category "A" illustrates that, of all advertisements actually presented to households, the detection rate was no greater than 91%. Similarly, category "F" illustrates that, of all advertisements actually presented to households, the detection rate was no less than 60%. However, more or fewer categories may be employed, as needed. In the illustrated example, scaling factors are calculated based on this empirical range of detection capabilities. Scaling factors 405 of FIG. 4B are normalized to category "A," and are based on dividing the most successful category (i.e., category "A" having an average detection rate of 0.91) by each individual category. As such, the scaling factor for category "F" was based on dividing 0.91 by 0.60, the scaling factor for category "E" was based on dividing 0.91 by 0.70, the scaling factor for category "D" was based on dividing 0.91 by 0.80, the scaling factor for category "C" was based on dividing 0.91 by 0.85, the scaling factor for category "B" was based on dividing 0.91 by 0.87, and the scaling factor for category "A" was based on dividing 0.91 by 0.91.

Without limitation, the scaling factors may be calculated with additional and/or alternate mathematical approaches. For example, scaling factors 410 of FIG. 4C are normalized to 100%, and are based on dividing 1.00 by each corresponding category average. As such, the scaling factor for category "A" was based on dividing 1.00 by 0.91, the scaling factor for category "B" was based on dividing 1.00 by 0.87, the scaling factor for category "C" was based on dividing 1.00 by 0.85, the scaling factor for category "D" was based on dividing 1.00 by 0.80, the scaling factor for category "E" was based on dividing 1.00 by 0.70, and the scaling factor "F" was based on dividing 1.00 by 0.60. Upon completion of calculating scaling factors, the correlator 220 forwards the scaling factors to the factored media library 120 so that such factors may be applied to audience data received by the households 145.

Figure 5:
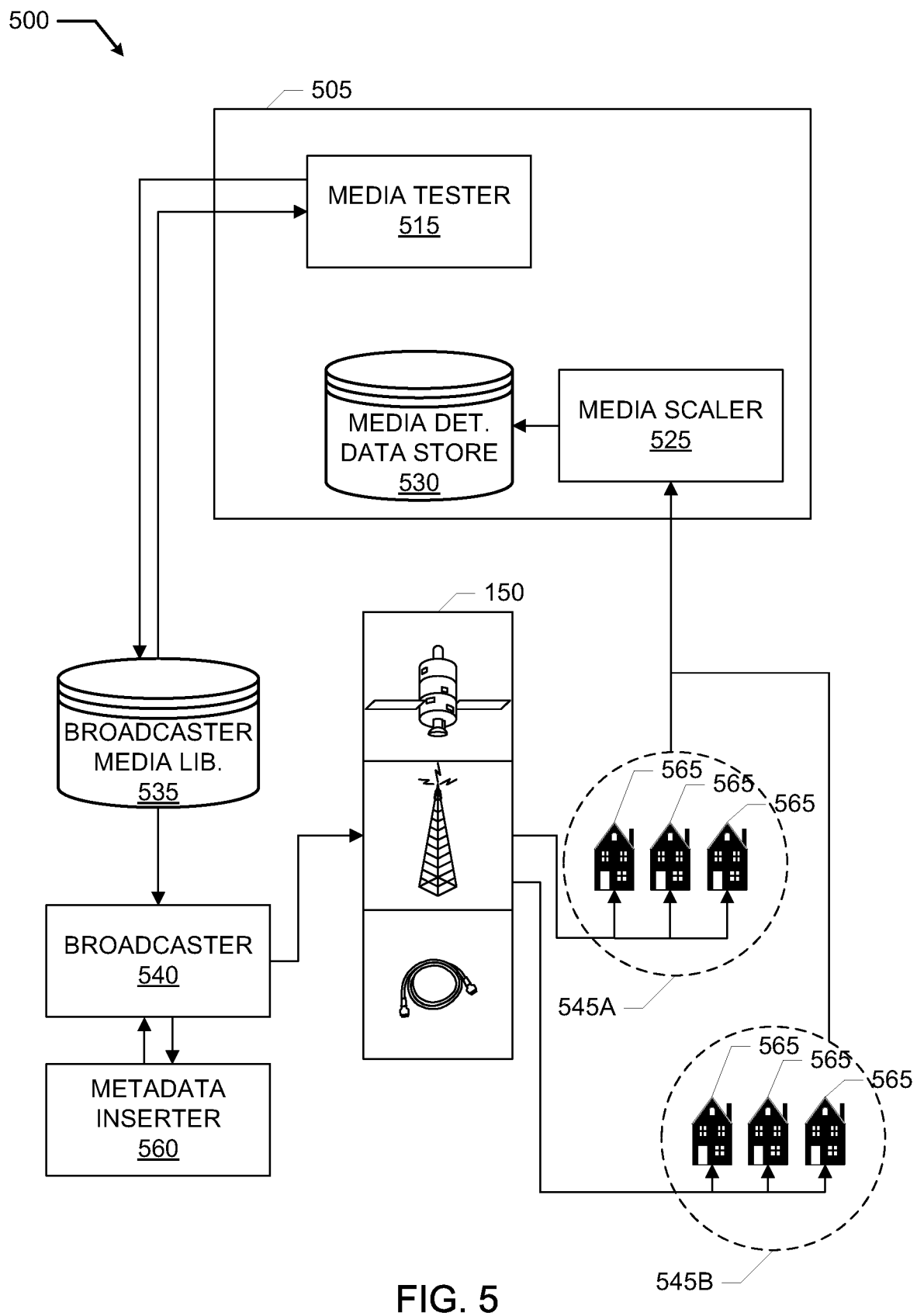
FIG. 5 is a schematic diagram of another example system to pre-scale media content to facilitate audience measurement.

FIG. 5 illustrates an alternate example system 500 to pre-scale media content. The system 500 of FIG. 5 includes components that are similar to those illustrated in FIG. 1, and are provided with similar identification numbers having a "500" series nomenclature. Generally speaking, rather than the CO employing redundant libraries and/or servers to receive detected advertisement identifiers and query the library for one or more scaling factors, the example system 500 of FIG. 5 embeds one or more scaling factors within the media content as metadata. In operation, an advertisement from a broadcast media library 535 is provided to a media tester 515 of a central office (CO) 505 to determine detection capabilities of the advertisement and apply one or more scaling factors thereto. As described above in view of FIGS. 1 and 2, the media tester 115 employs a correlator 220 to calculate the scaling factors, a description of which will not be repeated. However, unlike the example system 100 of FIG. 1, in which the scaling factors are provided to a factored media library 120 owned, managed, and/or operated by the CO 105, the example system 500 of FIG. 5 returns the scaling factors to the broadcast media library 535. Such scaling factors are associated with the tested advertisement and stored for future use during broadcasting. As a result, the CO 505 is not burdened with storage tasks and/or query tasks that typically require database servers, such as structured query language (SQL) servers.

In the illustrated example of FIG. 5, the broadcaster 540 retrieves one or more advertisements from the broadcast media library 535, in which such advertisements include associated scaling factor information. As described above, the associated scaling factor information may be specific to, and used for, specific presentation scenarios. For example, some of the scaling factors may only be used when the advertisement is broadcast to the households when there is a single code embedded therein. Alternatively, a separate scaling factor may be used when the broadcast advertisement includes two or more codes embedded therein. As described above, the appropriate scaling factor may be selected based on which geographic region presents the advertisement having a single embedded code (e.g., a single code (e.g., program identification code) repeating every six seconds in the advertisement) versus which geographic region presents the advertisement having more than one embedded code (e.g., an advertisement having one program identification code and one national broadcaster identification code repeating in a non-overlapping manner). Before the broadcaster transmits the advertisement to one or more households, a metadata inserter 560 embeds one or more scaling factors in the advertisement as metadata. The metadata inserter 560 returns the advertisement media to the broadcaster 540 for transmission to one or more households 545A and/or 545B.

In the illustrated example, the household 545A is in a first geographic region, and the household 545B is in a second geographic region. Each of the audience member households includes audience measurement equipment 565 to, among other things, acquire data indicative of audience behavior. As described above, audience behavior of interest to marketing entities and/or broadcasters may include, but is not limited to, broadcast programs watched, movies watched, commercials watched, video games played, audience viewing habits based on the time of day, and/or audience member remote control usage (e.g., volume up/down, channel up/down, etc.). The audience measurement equipment 565 of the households 545A and 545B also detect one or more codes embedded within the broadcast advertisement(s) and may forward an indication of such detected advertisements (and/or number of codes counted in the advertisements) to the CO 505.

Figure 6:
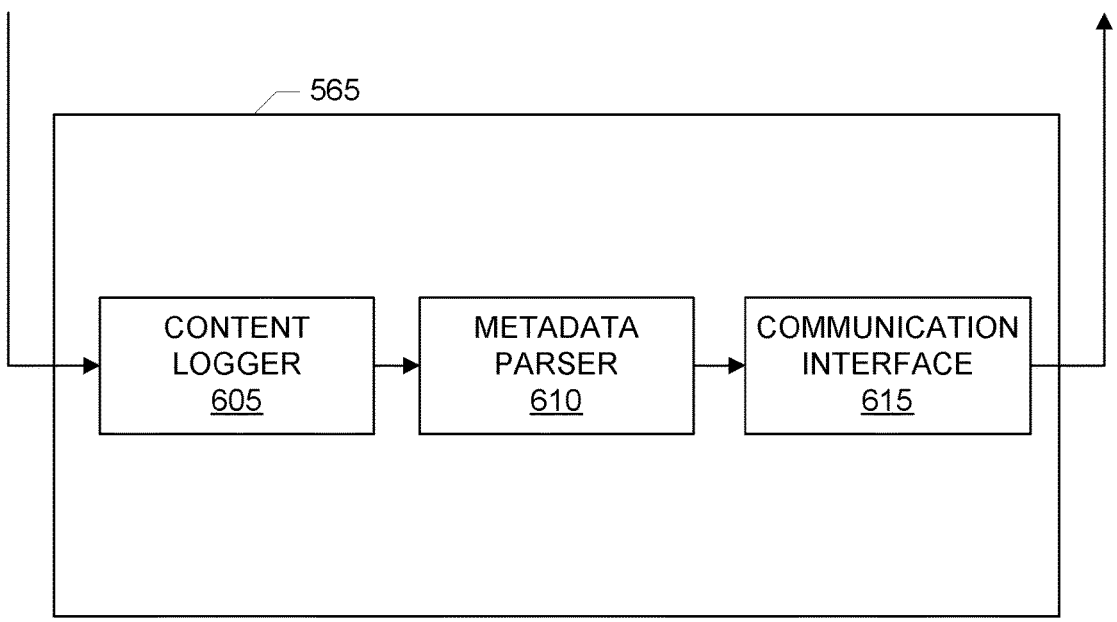
FIG. 6 is a more detailed illustration of audience measurement equipment of the example system of FIG. 5.

FIG. 6 illustrates additional detail of the example audience measurement equipment 565 that may be operating in the households 545A and 545B. In the illustrated example, the audience measurement equipment 565 includes a content logger 605, a metadata parser 610, and a communication interface 615. The example content logger 605 monitors A/V signals originating from the broadcaster 540 (e.g., radio frequency (RF) tuners, cable set-top boxes, satellite receivers, etc.) and/or from digital versatile disk (DVD) players, digital video recorders (DVRs), video cassette recorders (VCRs), and/or other types of A/V equipment. The content logger 605 may perform one or more audience measurement logging activities not relevant to this disclosure, and will not be discussed further herein. However, the metadata parser 610 monitors for media, such as advertisements, that have metadata embedded therein. Upon detecting, for example, an advertisement having metadata, the metadata parser 610 extracts the metadata and any scaling factor(s) that were inserted into the advertisement by the metadata inserter 560. The extracted scaling factor(s) are provided to the communication interface 615 and forwarded to the media scaler 525 of the CO 505. Without limitation, the metadata parser 610 may batch a predetermined amount of collected information before sending it to the CO 505. For example, the metadata parser 610 may collect scaling factors during a twelve hour period before forwarding the number of detected codes and associated scaling factors to the communication interface 615.

Returning to FIG. 5, the example media scaler 525 receives the detected codes and associated scaling factor(s), and performs a calculation on the detected codes using the provided scaling factor(s). As such, the CO 505 does not need to employ additional database servers or query a library of advertisements to find the associated scaling factor(s). The calculated detection rates are stored in the media detection data store 530.

In the event that the broadcaster 540 knows particular characteristics of the destination households 545A and 545B, the metadata inserter 560 may selectively choose which scaling factors to embed into the advertisement before broadcasting. For example, if the broadcaster 540 knows that households in the first geographic region 545A only have a single code embedded therein (e.g., a low encoding density value containing only a program identification code), then the metadata inserter 560 will insert only such scaling factors that are associated with that advertisement when broadcasting a single embedded code. As a result, rather than sending all known scaling factors as metadata, the bandwidth limitations for inserting metadata are more efficiently utilized by selectively placing only such scaling factors that are needed into the metadata. Additionally, in the event that the broadcaster 540 knows that households in the second geographic region 545B have three codes embedded in the advertisement (e.g., a relatively higher encoding density value), then the metadata inserter 560 can embed only such associated scaling factors before the broadcaster 540 sends the media to the households in the second geographic region 545B.

Even in the event that multiple scaling factors are embedded into the metadata of the advertisement by the metadata inserter 560, the audience measurement equipment 565 may selectively parse and extract only such scaling functions that are needed in view of household conditions. In the illustrated example audience measurement equipment 565 of FIG. 6, the metadata parser 610 extracts all of the received scaling functions, and compares the scaling functions against measured data collected by the content logger 605. For example, if the content logger 605 includes collected data indicating that the audience member has the television set to a volume level of 35 dB, then the metadata parser 610 retains only the scaling factor(s) associated with that volume level. In another example, if the metadata parser 610 identifies one or more scaling factors, each one to be used in a specific geographic location, then the metadata parser 610 may retain only such scaling factor associated with the location in which the audience measurement equipment 565 is located. As a result, only such scaling factor(s) that are needed are forwarded from the metadata parser 610 (via the communication interface 615) to the advertising scaler 525 of the CO 505.

Figure 7:
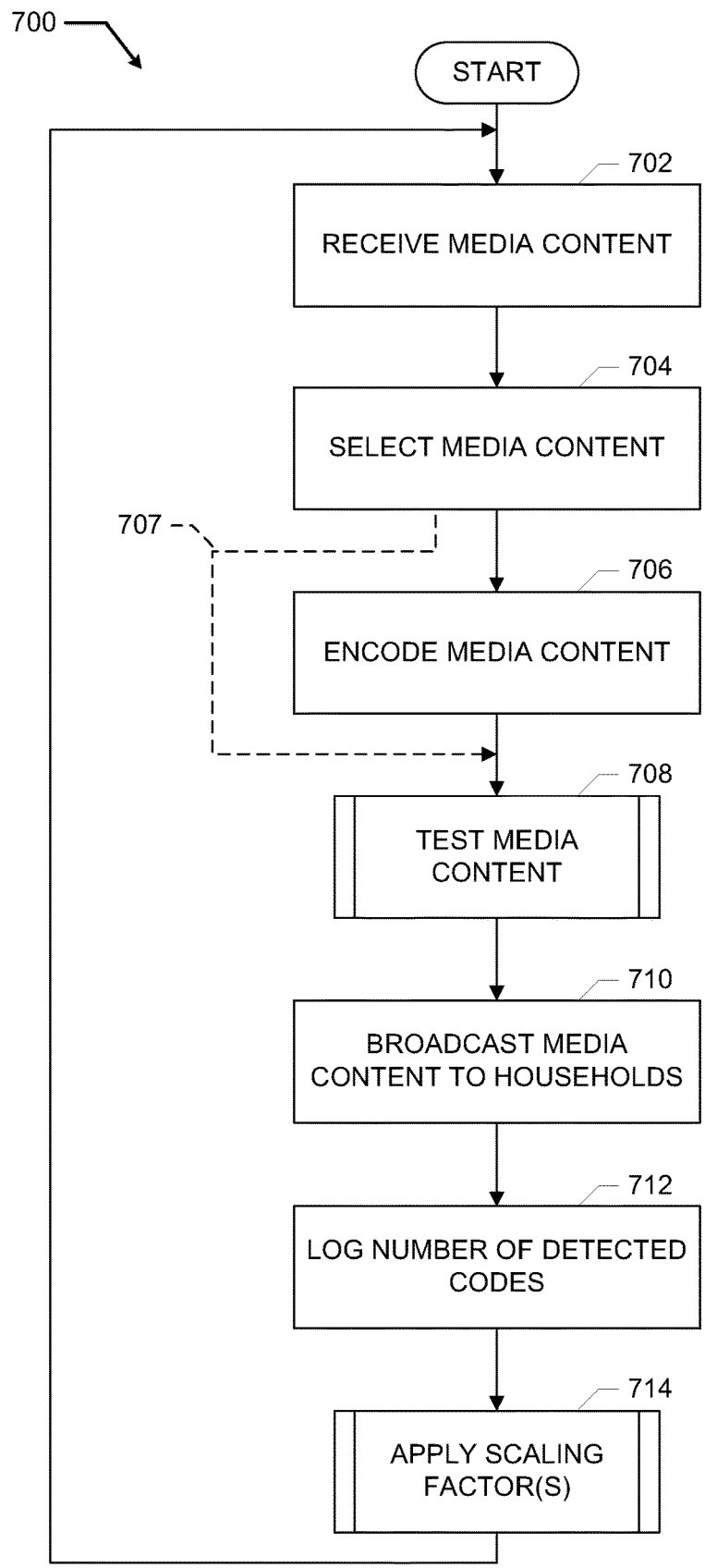
FIGS. 7-9 are flow diagrams representative of example machine readable instructions which may be executed to implement the example systems of FIGS. 1 and/or 5.
Figure 8:
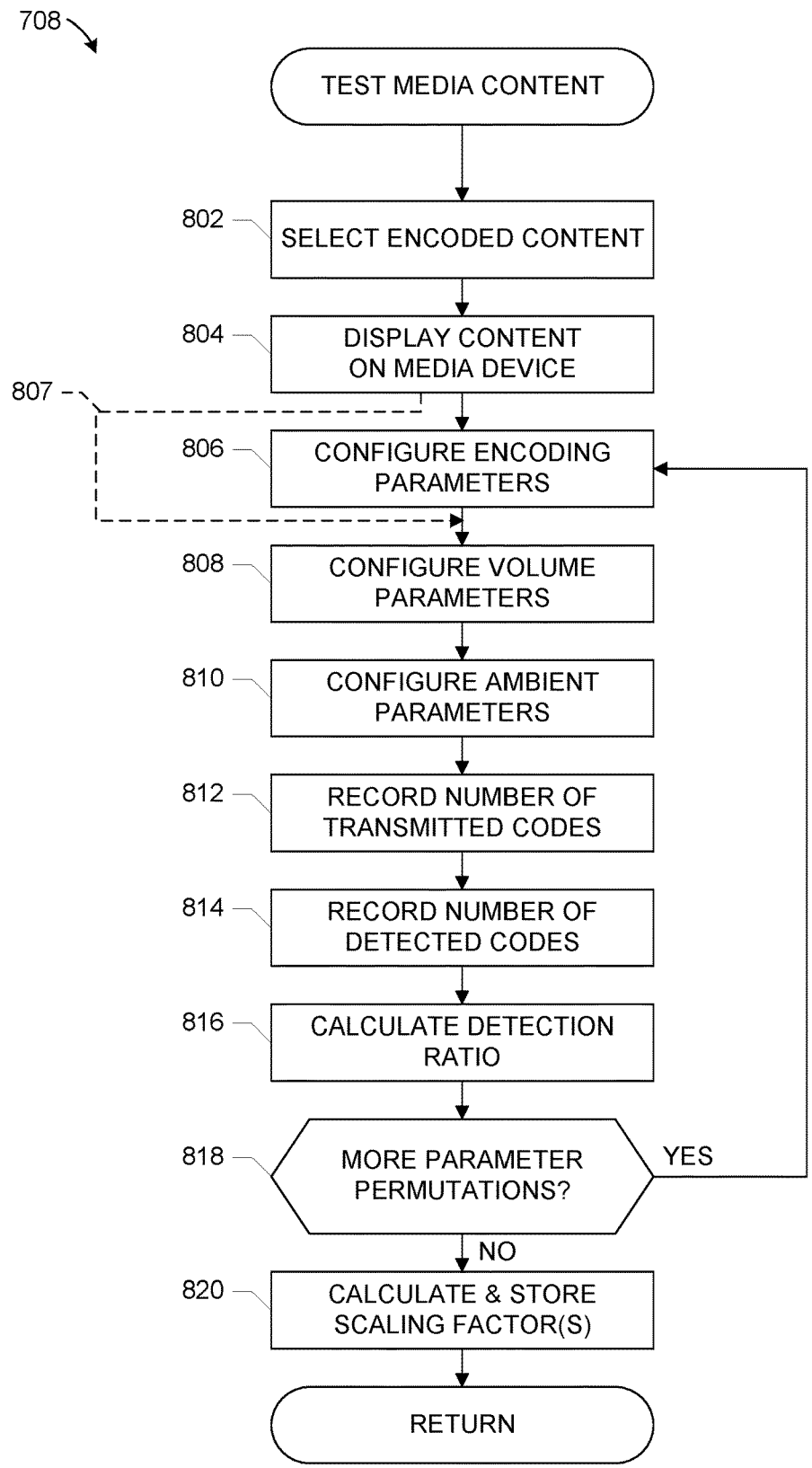
Figure 9:
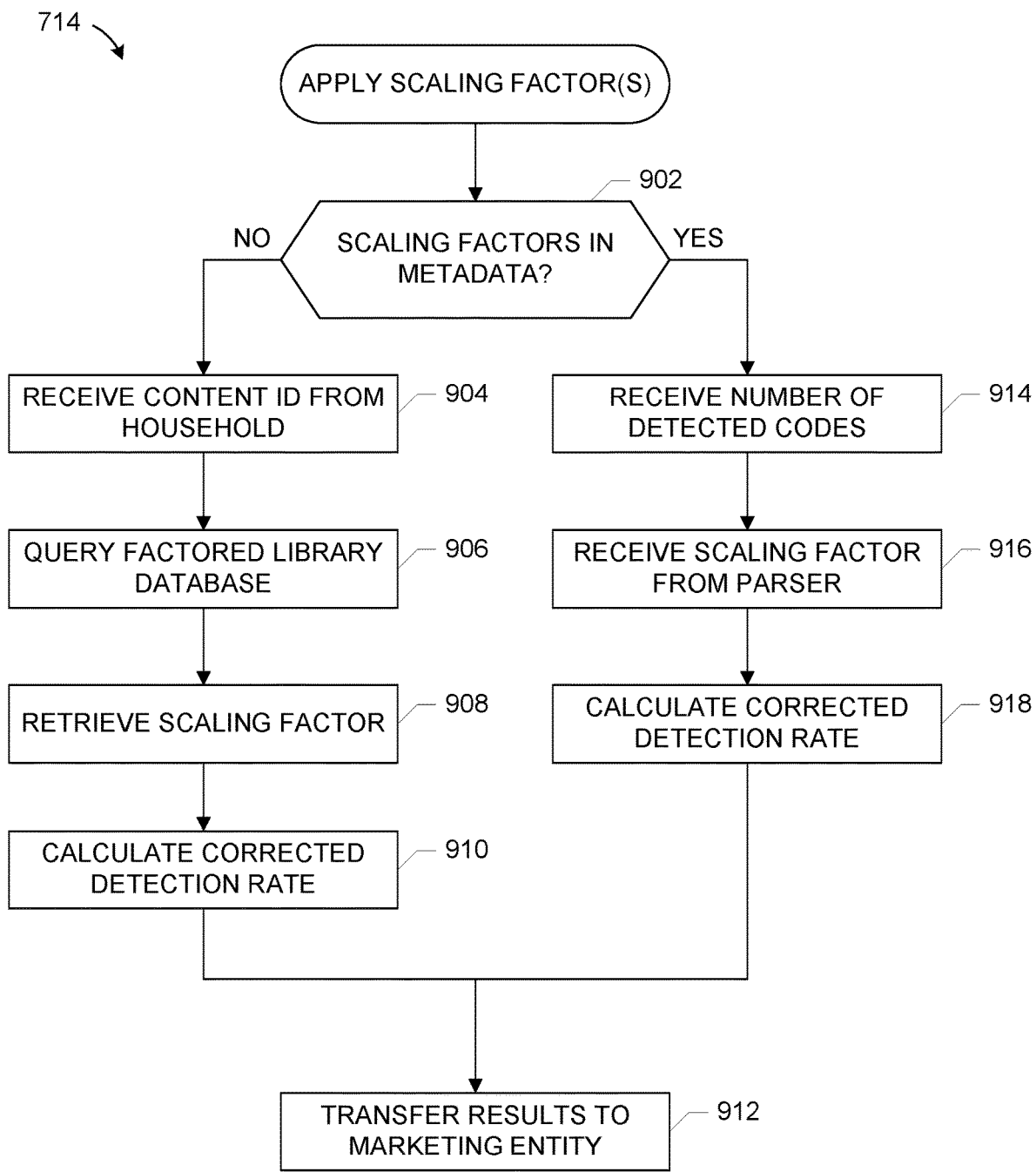

Flowcharts representative of example machine readable instructions for implementing any of the example systems of FIGS. 1-6 to wirelessly meter an A/V device are shown in FIGS. 7-9. In this example, the machine readable instructions comprise a program for execution by: (a) a processor such as the processor 1012 shown in the example computer 1000 discussed below in connection with FIG. 10, (b) a controller, and/or (c) any other suitable processing device. The program may be embodied in software stored on a tangible medium such as, for example, a flash memory, a CD-ROM, a floppy disk, a hard drive, a digital versatile disk (DVD), or a memory associated with the processor 1012, but the entire program and/or parts thereof could alternatively be executed by a device other than the processor 1012 and/or embodied in firmware or dedicated hardware (e.g., it may be implemented by an application specific integrated circuit (ASIC), a programmable logic device (PLD), a field programmable logic device (FPLD), discrete logic, etc.). Also, some or all of the machine readable instructions represented by the flowcharts of FIG. 7-9 may be implemented manually. Further, although the example program is described with reference to the flowcharts illustrated in FIGS. 7-9, many other methods of implementing the example machine readable instructions may alternatively be used. For example, the order of execution of the blocks may be changed, and/or some of the blocks described may be changed, substituted, eliminated, or combined.

FIG. 7 is a flowchart representative of machine readable instructions 700 that may be executed to determine media content detectability. The process 700 of FIG. 7 begins at block 702 where the CO 105, 505 retrieves media content. The CO 105, 505 may query the CO media library 110, query the broadcast media library 535, and/or receive media content sent by the broadcast media library 135, 535 (block 702). In the event that the CO 105, 505 queries the library, the CO 105, 505 selects media content from the broadcast media library 110, 135, 535 that has not yet been analyzed for detection effectiveness (block 704). However, if the CO 105, 505 receives the media content rather than retrieves it, block 704 may be eliminated.

In the illustrated example flowchart 700, media content received by the CO 105, 505 is further received by the media tester 115, 515 and encoded (block 706) with one or more codes provided by the broadcaster 140, 540. The media tester 115, 515 tests the media (block 708), such as, for example, an advertisement, to determine appropriate scaling factors based on detection capabilities of the advertisement under one or more conditions. As discussed in further detail below, the tested advertisements (block 708) are associated with one or more scaling factors before providing the broadcaster 140, 540 with the advertisement and broadcasting it to one or more households (block 710). Because each household contains audience measurement equipment, such as the audience measurement equipment 565 shown in FIG. 6, the number of detected codes is logged (block 712) and returned to the CO 105, 505 for scaling adjustment(s) (block 714).

In the event that the broadcaster 140, 540 has no interest in having the example media tester 115, 515 encode one or more codes in the advertisement, block 706 may be skipped (dashed line 707). In some instances, the broadcaster 140, 540 may prefer to employ different, unique, complex, and/or proprietary encoding techniques to the media content without any third party involvement. Nonetheless, the media tester 115, 515 may still test such a pre-encoded advertisement that is provided by the broadcaster 140, 540 to determine one or more scaling factor(s). For example, the broadcaster 140, 540 may provide the media tester 115, 515 a pre-encoded advertisement, but disclose the number of embedded codes and/or timestamp(s) associated with the embedded codes. As such, the media tester 115, 515 may perform one or more iterative tests on the advertisement to determine a ratio of transmitted codes to detected codes, and calculate one or more scaling factors associated with one or more permutations of ambient conditions (e.g., a household audience volume level, a playback volume level, a particular brand/model number of audience detection equipment 565, etc.).

FIG. 8 illustrates additional detail of the media content testing (block 708) described above. In the illustrated example, the media tester 115 selects and/or receives the encoded content (block 802) from the broadcaster and presents the content (e.g., the advertisement with an embedded code) on a media device, such as a television (block 804). However, before calculating one or more detection ratios, the correlator 220 configures the layer controller 225 to encode a predetermined number of layers of codes in the media content (block 806). However, as described above, the broadcaster may prefer to forego one or more encoding operations (dashed line 807) in favor of testing the advertisement with the one or more embedded codes encoded by the broadcaster. Additionally, the correlator 220 may configure a volume level of the media device 210 via the volume controller 230 (block 808), and configure ambient noise parameters (block 810) via the ambient noise generator 235. Additionally or alternatively, blocks 806 and 808 may be eliminated so that, for example, one or more tests can be performed on the media content with respect to only the ambient parameters (block 810). In either example situation, the correlator 220 records the number of transmitted codes (block 812) and the number of detected codes (block 814) to calculate a detection ratio for those particular conditions (block 816). However, as described above, if the broadcaster provides the advertisement pre-encoded, the number of embedded codes is also provided before testing begins to allow the correlator 220 to calculate the detection ratio.

In the event that additional variations of parameters are needed and/or desired to accommodate alternate conditions in which an advertisement may be presented to audience measurement equipment (block 818), the example process may return to block 806 to re-configure such parameters before calculating additional detection ratios. The detection ratios are used by the correlator 220 to calculate one or more scaling factors (block 820) in a manner described above in view of FIGS. 4A, 4B, and/or 4C. Calculated scaling factors are stored in the factored media library 120 of the CO 105, or stored on the broadcast media library 535 that is owned, operated, and/or managed by the broadcaster (block 820).

FIG. 9 illustrates additional detail of the application of scaling factors (block 714) described above. In the illustrated example, if the scaling factors are not stored as metadata (block 902), the media scaler 125 of the CO 105 receives content identification information from the sample households 145 (block 904). In the illustrated example, the content identification information includes an identifier to communicate which advertisement and/or other media content was detected by the audience measurement equipment in the household(s) 145, such as a program identification code. The media scaler 125 queries the factored media library 120 with the advertisement identifier (block 906) and receives the associated scaling factor(s) associated with that advertisement (block 908). A corrected detection rate is calculated by the example media scaler 125 using the scaling factors received by the factored media library 120 (block 910) and saved to the media detection data store 130, which may be accessible by the broadcaster. Such accessibility of the corrected detection rate(s) may be transferred to the broadcaster and/or marketing entity (block 912) and/or the marketing entity may have limited access to the media detection data store 130.

If the scaling factors are stored as metadata (block 902), then the media scaler 525 receives the number of detected codes from the household (block 914) along with the retained scaling factor from the metadata parser 610 (block 916), as described above. The media scaler 525 calculates one or more corrected detection rate(s) (block 918) based on the received detected number of codes and scaling factor. The corrected detection rate(s) may be transferred to the broadcaster and/or marketing entity (block 912) and/or the marketing entity may have limited access to the media detection data store 530.

Figure 10:
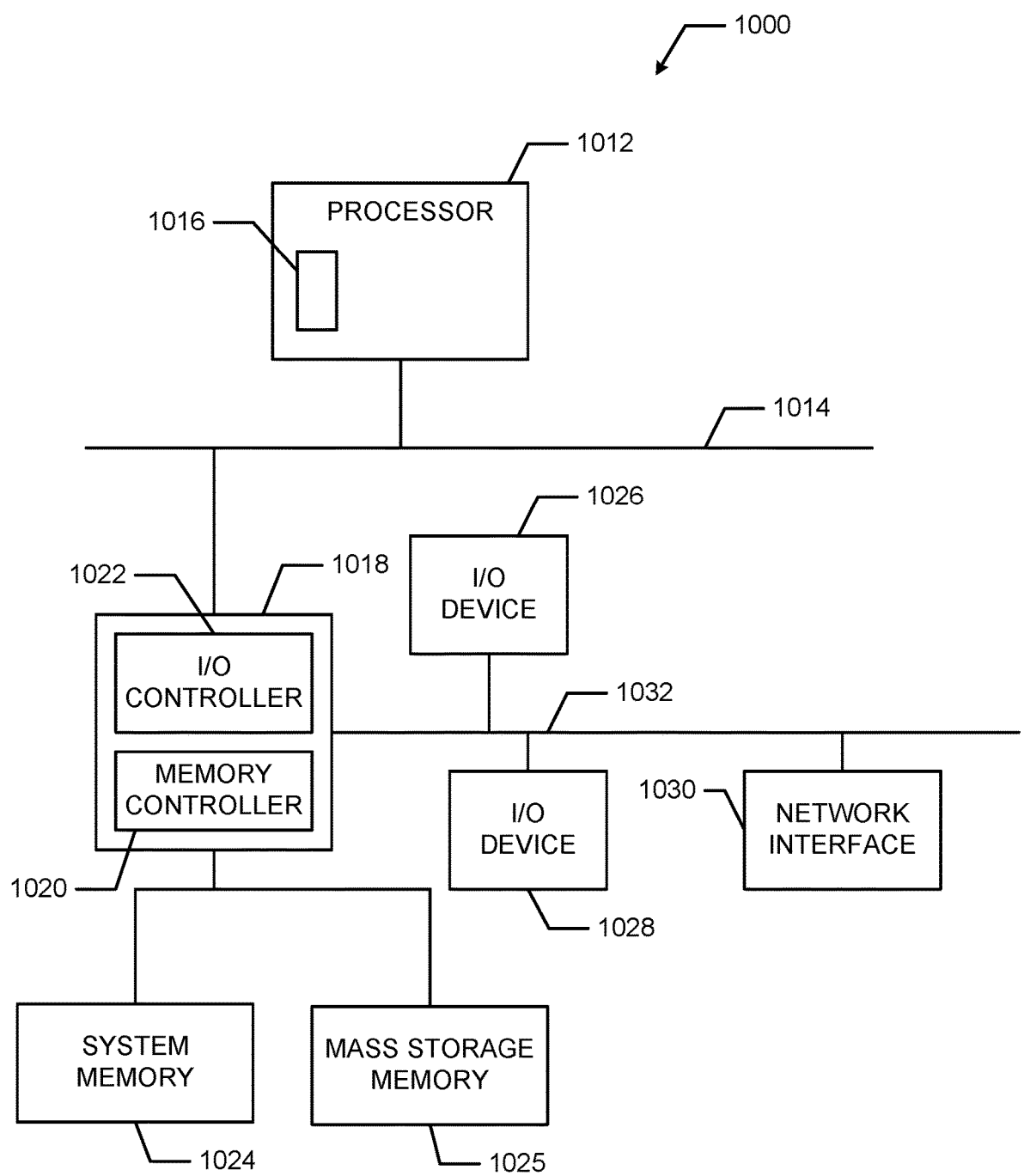
FIG. 10 is a schematic illustration of an example processor system that may execute the machine readable instructions of FIGS. 7-9 to implement the example systems of FIGS. 1 and/or 5.

FIG. 10 is a block diagram of an example processor system that may be used to execute the example machine readable instructions of FIGS. 7-9 to implement the example systems and/or methods described herein. As shown in FIG. 10, the processor system 1010 includes a processor 1012 that is coupled to an interconnection bus 1014. The processor 1012 includes a register set or register space 1016, which is depicted in FIG. 10 as being entirely on-chip, but which could alternatively be located entirely or partially off-chip and directly coupled to the processor 1012 via dedicated electrical connections and/or via the interconnection bus 1014. The processor 1012 may be any suitable processor, processing unit or microprocessor. Although not shown in FIG. 10, the system 1010 may be a multi-processor system and, thus, may include one or more additional processors that are identical or similar to the processor 1012 and that are communicatively coupled to the interconnection bus 1014.

The processor 1012 of FIG. 10 is coupled to a chipset 1018, which includes a memory controller 1020 and an input/output (I/O) controller 1022. As is well known, a chipset typically provides I/O and memory management functions as well as a plurality of general purpose and/or special purpose registers, timers, etc. that are accessible or used by one or more processors coupled to the chipset 1018. The memory controller 1020 performs functions that enable the processor 1012 (or processors if there are multiple processors) to access a system memory 1024 and a mass storage memory 1025.

The system memory 1024 may include any desired type of volatile and/or non-volatile memory such as, for example, static random access memory (SRAM), dynamic random access memory (DRAM), flash memory, read-only memory (ROM), etc. The mass storage memory 1025 may include any desired type of mass storage device including hard disk drives, optical drives, tape storage devices, etc.

The I/O controller 1022 performs functions that enable the processor 1012 to communicate with peripheral input/output (I/O) devices 1026 and 1028 and a network interface 1030 via an I/O bus 1032. The I/O devices 1026 and 1028 may be any desired type of I/O device such as, for example, a keyboard, a video display or monitor, a mouse, etc. The network interface 1030 may be, for example, an Ethernet device, an asynchronous transfer mode (ATM) device, an 802.11 device, a digital subscriber line (DSL) modem, a cable modem, a cellular modem, etc. that enables the processor system 1010 to communicate with another processor system.

While the memory controller 1020 and the I/O controller 1022 are depicted in FIG. 10 as separate functional blocks within the chipset 1018, the functions performed by these blocks may be integrated within a single semiconductor circuit or may be implemented using two or more separate integrated circuits.

Although certain methods, apparatus, systems, and articles of manufacture have been described herein, the scope of coverage of this patent is not limited thereto. To the contrary, this patent covers all methods, apparatus, systems, and articles of manufacture fairly falling within the scope of the appended claims either literally or under the doctrine of equivalents.

What is claimed is:

1. An apparatus comprising:
    memory;
    computer-readable instructions; and
    one or more processors configured to execute the computer-readable instructions to:
        cause presentation of an encoded media sample in a first ambient environment provided by a media tester, the encoded media sample including an original number of codes, the first ambient environment having a first ambient configuration value;
        identify a detected number of codes extracted from the encoded media sample presented in the first ambient environment;
        generate a scaling factor for the encoded media sample based on the first ambient configuration value and a ratio of (a) the original number of codes to (b) the detected number of codes; and
        determine a threshold value based on the scaling factor, the threshold value to correspond to a portion of the original number of codes required to be detected to establish detection of an advertisement associated with the encoded media sample when the encoded media sample is subsequently presented via a device other than the media tester in a second ambient environment, the second ambient environment having a characteristic corresponding to the first ambient configuration value.

2. The apparatus as defined in claim 1, wherein the one or more processors are configured to execute the computer-readable instructions to embed the ratio in the encoded media sample as metadata.

3. The apparatus as defined in claim 1, wherein the one or more processors are configured to execute the computer-readable instructions to cause ambient noise to be presented during the presentation of the encoded media sample in the first ambient environment.

4. The apparatus as defined in claim 1, wherein the one or more processors are configured to execute the computer-readable instructions to establish a volume level at which the encoded media sample is to be presented.

5. The apparatus as defined in claim 1, wherein the one or more processors are configured to execute the computer-readable instructions to:
    associate the scaling factor with the encoded media sample; and
    store the scaling factor in a database.

6. The apparatus as defined in claim 1, wherein the one or more processors are configured to execute the computer-readable instructions to assign the encoded media sample to a first detection category based on the scaling factor, the first detection category to be assigned relative to a second detection category associated with a different scaling factor than the first detection category.

7. The apparatus as defined in claim 1, wherein the encoded media sample includes the advertisement.

8. The apparatus as defined in claim 1, wherein respective ones of the codes are audio watermarks.

9. An apparatus comprising:
    means for playing an encoded media sample in a first ambient environment provided by a media tester, the encoded media sample including an original number of codes, the first ambient environment having a first ambient configuration value;
    means for detecting a detected number of codes extracted from the encoded media sample played in the first ambient environment; and
    a correlator to:
        generate a scaling factor for the encoded media sample based on the first ambient configuration value and a ratio of (a) the original number of codes to (b) the detected number of codes; and
        determine a threshold value based on the scaling factor, the threshold value to correspond to a portion of the original number of codes required to be detected to establish detection of an advertisement associated with the encoded media sample when the encoded media sample is subsequently played via a device other than the media tester in a second ambient environment, the second ambient environment having a characteristic corresponding to the first ambient configuration value.

10. The apparatus as defined in claim 9, further including means for playing ambient noise while the encoded media sample is being played by the means for playing the encoded media sample.

11. The apparatus as defined in claim 9, further including means for establishing a volume level at which the means for playing the encoded media sample is to play the encoded media sample.

12. The apparatus as defined in claim 9, wherein the encoded media sample includes the advertisement.

13. A non-transitory computer-readable medium comprising computer-readable instructions that, when executed, cause one or more processors to at least:
    cause presentation of an encoded media sample in a first ambient environment provided by a media tester, the encoded media sample including an original number of codes, the first ambient environment having a first ambient configuration value;

identify a detected number of codes extracted from the encoded media sample presented in the first ambient environment;

generate a scaling factor for the encoded media sample based on the first ambient configuration value and a ratio of (a) the original number of codes to (b) the detected number of codes; and determine a threshold value based on the scaling factor, the threshold value to correspond to a portion of the original number of codes required to be detected to establish detection of an advertisement associated with the encoded media sample when the encoded media sample is subsequently presented via a device other than the media tester in a second ambient environment, the second ambient environment having a characteristic corresponding to the first ambient configuration value.

14. The non-transitory computer-readable medium of claim 13, wherein the computer-readable instructions, when executed cause the one or more processors to embed the ratio in the encoded media sample as metadata.

15. The non-transitory computer-readable medium of claim 13, wherein the computer-readable instructions, when executed cause the one or more processors to cause ambient noise to be presented during the presentation of the encoded media sample in the first ambient environment.

16. The non-transitory computer-readable medium of claim 13, wherein the computer-readable instructions, when executed cause the one or more processors to establish a volume level at which the encoded media sample is to be presented.

17. The non-transitory computer-readable medium of claim 13, wherein the computer-readable instructions, when executed cause the one or more processors to:

associate the scaling factor with the encoded media sample; and store the scaling factor in a database.

18. The non-transitory computer-readable medium of claim 13, wherein the computer-readable instructions, when executed cause the one or more processors to assign the encoded media sample to a first detection category based on the scaling factor, the first detection category to be assigned relative to a second detection category associated with a different scaling factor than the first detection category.

19. The non-transitory computer-readable medium of claim 13, wherein the encoded media sample includes the advertisement.

20. The non-transitory computer-readable medium of claim 13, wherein respective ones of the codes are audio watermarks.

* * * * *